United States Patent
Shibukawa et al.

(10) Patent No.: US 10,194,044 B2
(45) Date of Patent: *Jan. 29, 2019

(54) SYSTEM AND METHOD FOR SHIFTING ELECTRIC POWER MODES IN AN IMAGE FORMING SYSTEM

(71) Applicant: Ricoh Company, Ltd., Tokyo (JP)

(72) Inventors: Tomoki Shibukawa, Tokyo (JP); Yoh Masuyama, Kanagawa (JP); Keisuke Iwasa, Kanagawa (JP); Tomoya Tanizaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,813

(22) Filed: Jul. 13, 2017

(65) Prior Publication Data
US 2017/0310841 A1 Oct. 26, 2017

Related U.S. Application Data

(63) Continuation of application No. 14/944,438, filed on Nov. 18, 2015, now Pat. No. 9,742,946.

(30) Foreign Application Priority Data

Nov. 20, 2014 (JP) ................................ 2014-235271
Jun. 9, 2015 (JP) ................................ 2015-116300

(51) Int. Cl.
H04N 1/00 (2006.01)
(52) U.S. Cl.
CPC ..... H04N 1/00896 (2013.01); H04N 1/00411 (2013.01); H04N 2201/0094 (2013.01)

(58) Field of Classification Search
None
See application file for complete search history.

(56) References Cited

U.S. PATENT DOCUMENTS 9,742,946 B2 *  8/2017  Shibukawa ........ H04N 1/00896
2009/0013200 A1  1/2009  Niikura
2009/0077400 A1  3/2009  Enami et al.

FOREIGN PATENT DOCUMENTS

JP   2011-034559   2/2011
JP   2011-182020   9/2011

* cited by examiner

Primary Examiner — Thomas D Lee
(74) Attorney, Agent, or Firm — IPUSA, PLLC

(57) ABSTRACT

An image forming system includes a main body including a first control part controlling a power mode of the main body and an engine executing image processing, and an operation apparatus receiving an operation for instructing the engine to execute the image processing. The operation apparatus including a second control part controlling a power mode of the operation apparatus. When the operation apparatus receives an instruction to shift the power mode of the main body or the operation apparatus, the first control part determines whether shifting is possible based on a first program executed by the main body and controls a power supply of the main body according to the determination, and the second control part determines whether shifting is possible based on a second program executed by the operation apparatus and controls a power supply of the operation apparatus according to the determination.

5 Claims, 19 Drawing Sheets

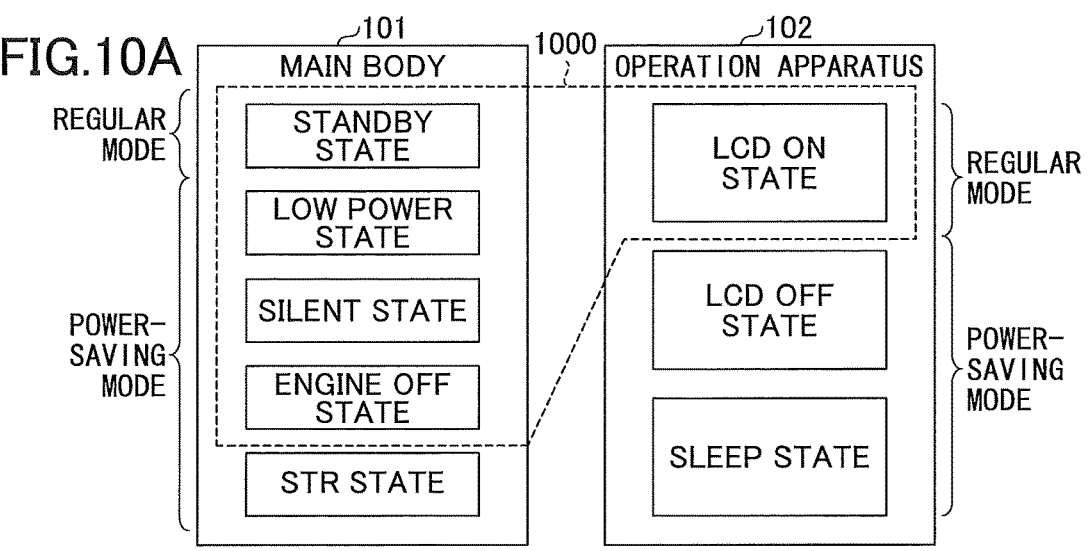
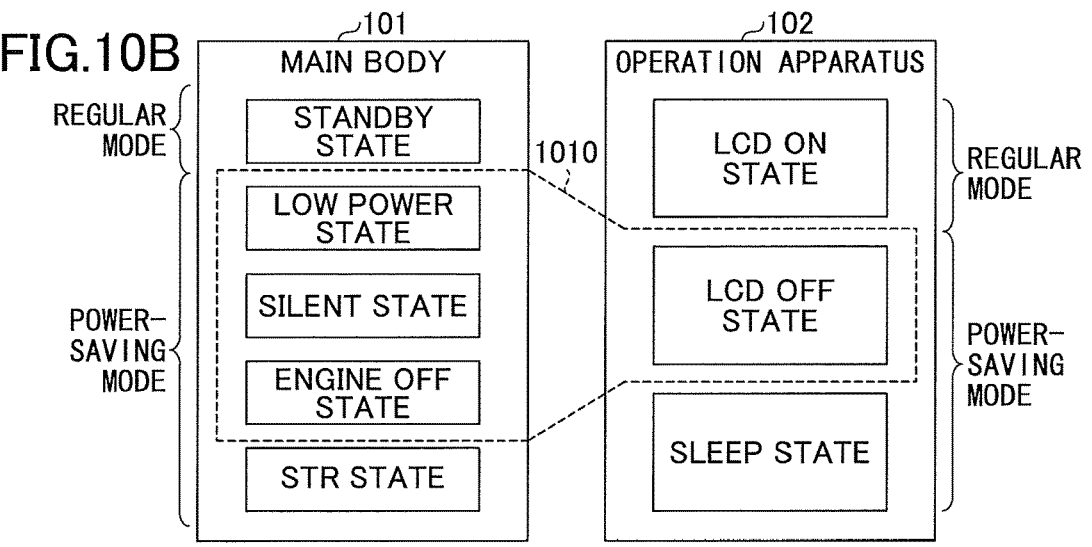
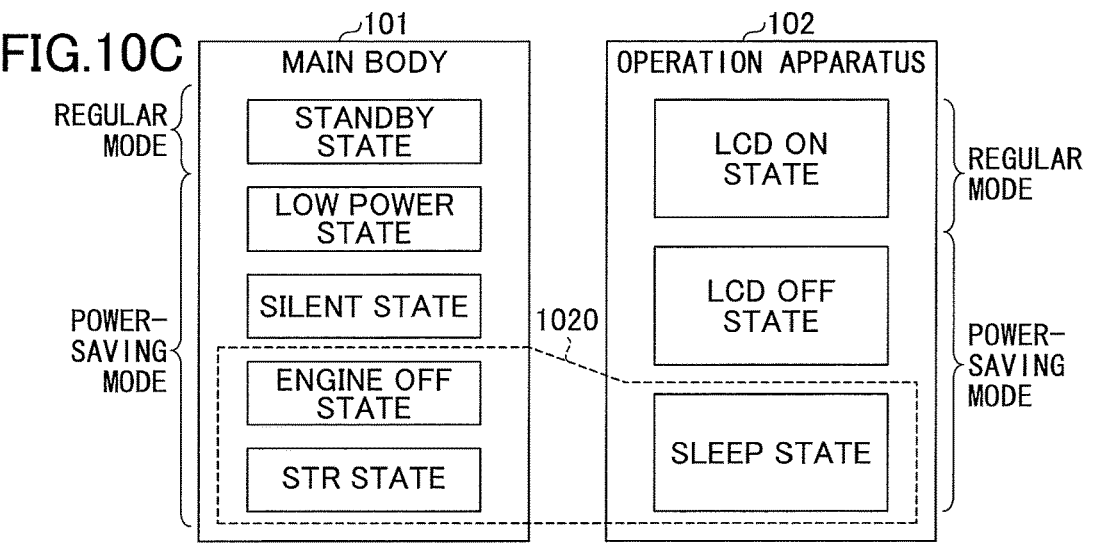

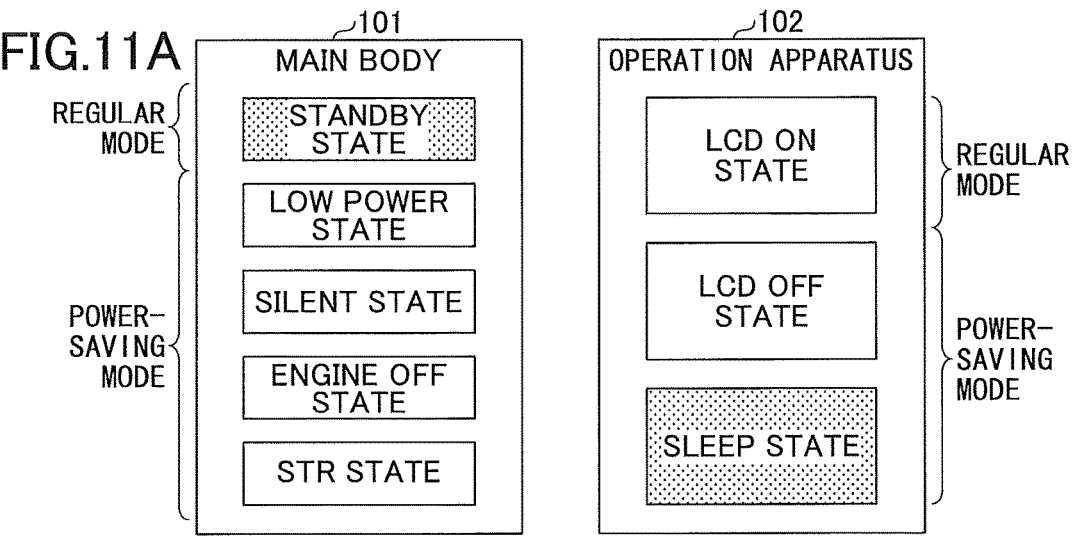
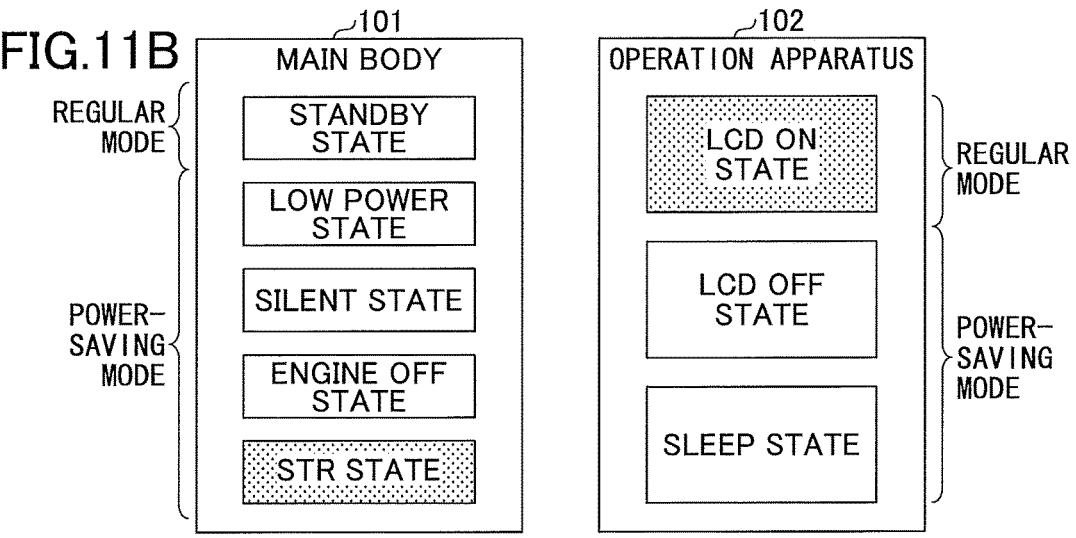
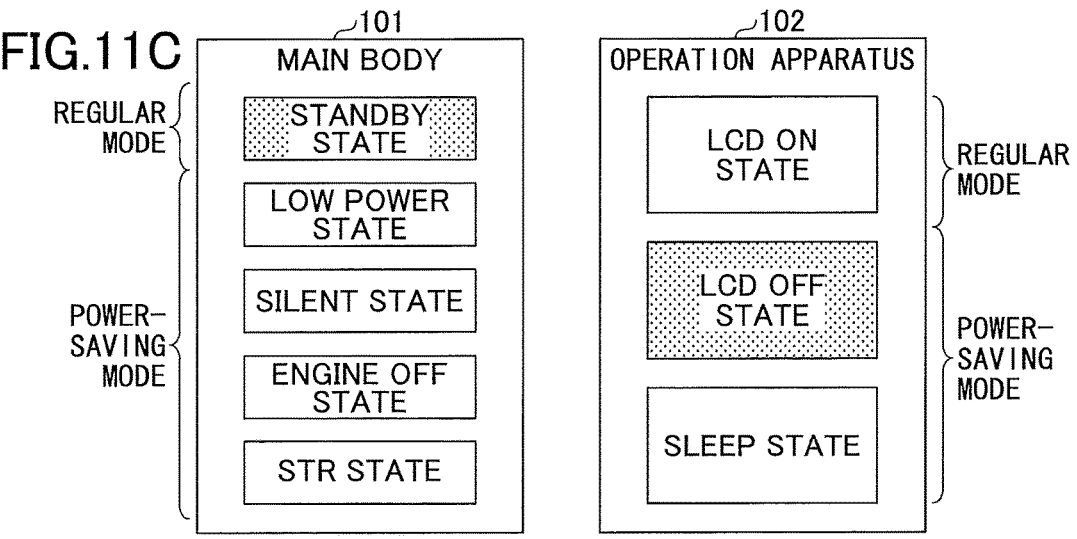

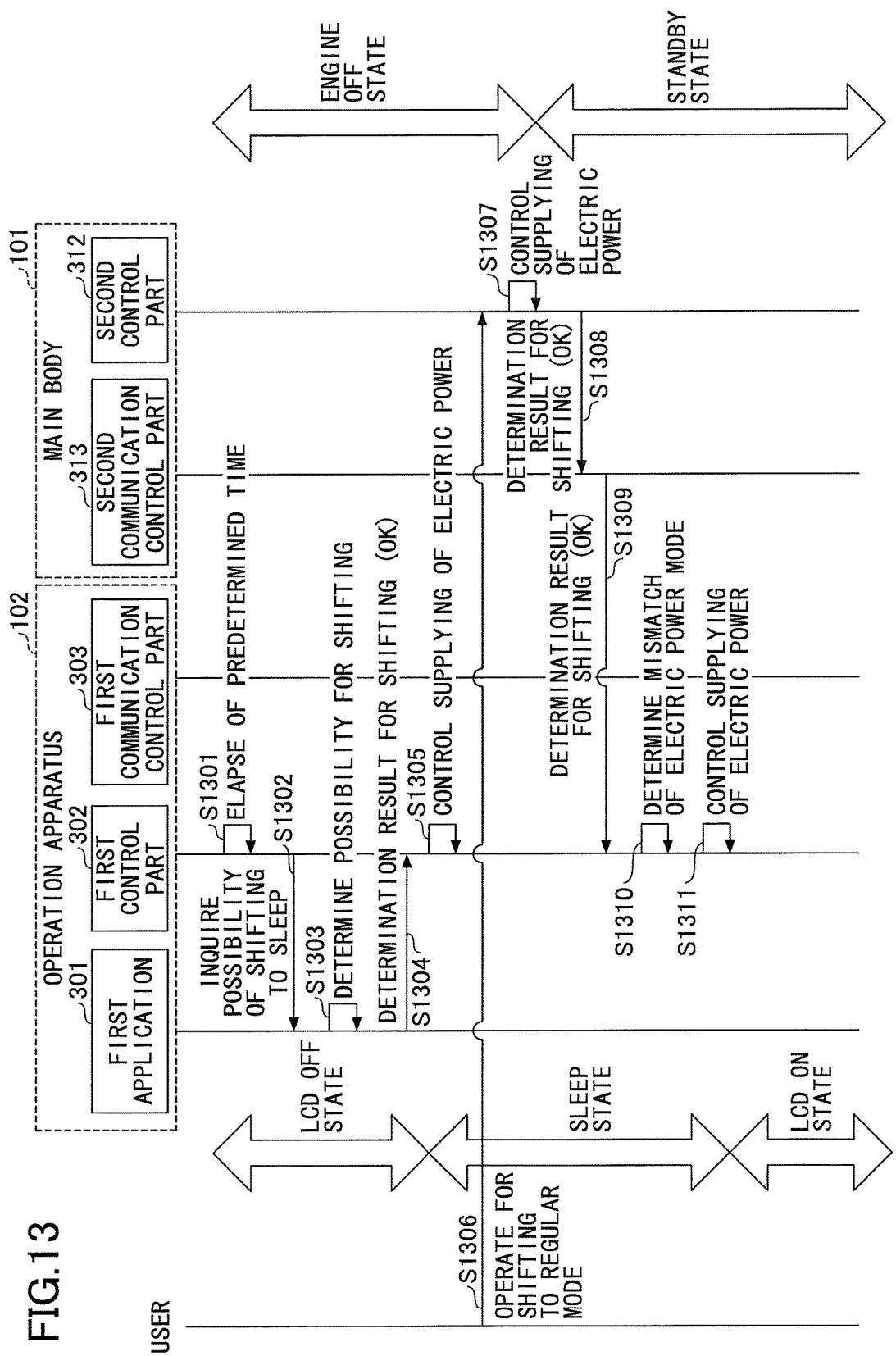

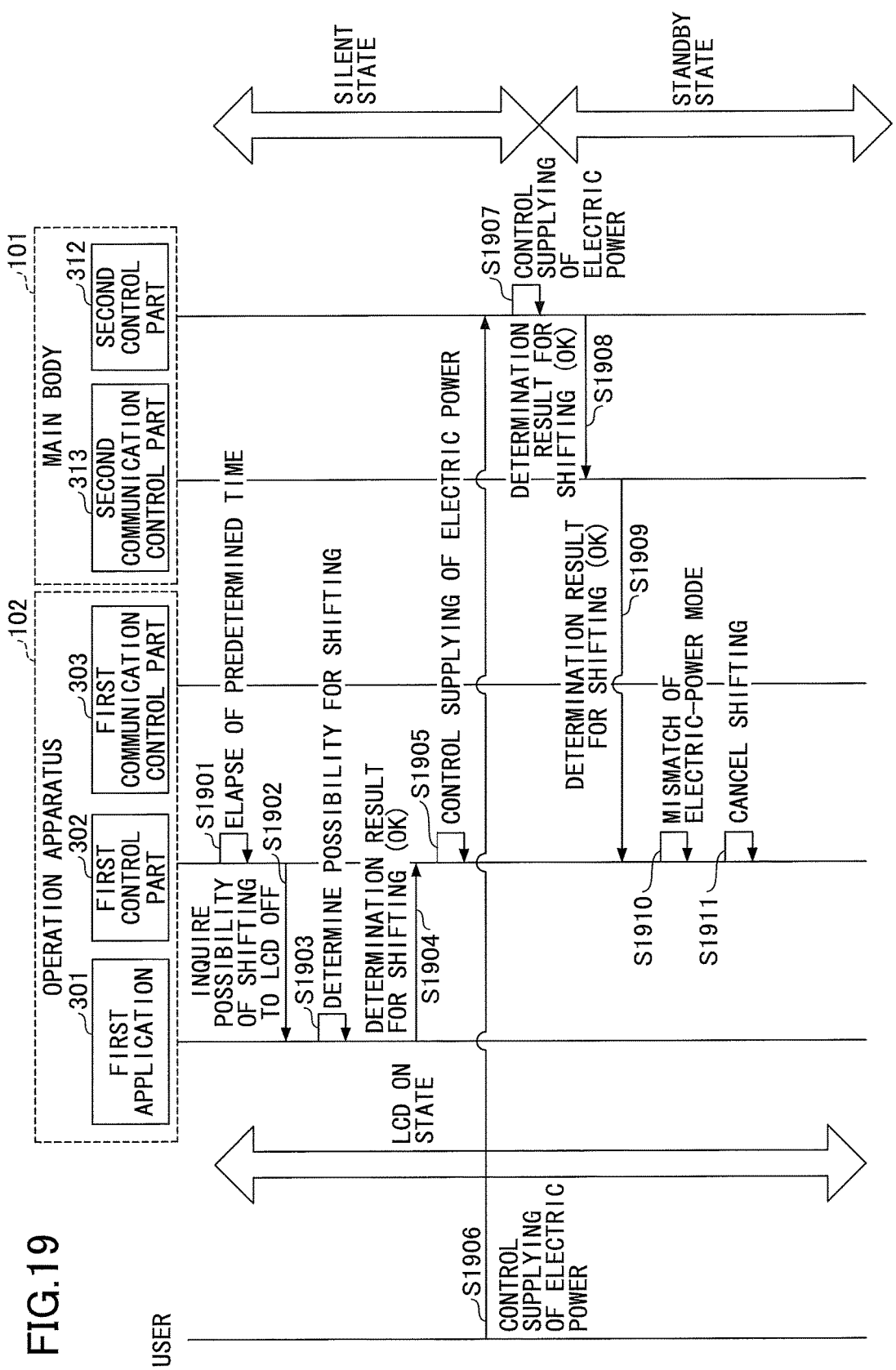

SYSTEM AND METHOD FOR SHIFTING ELECTRIC POWER MODES IN AN IMAGE FORMING SYSTEM

CROSS-REFERENCE TO RELATED APPLICATIONS

The present application is a continuation of U.S. patent application Ser. No. 14/944,438, filed on Nov. 18, 2015, which is based upon and claims priority to Japanese Priority Application Nos. 2014-235271 and 2015-116300 filed on Nov. 20, 2014 and Jun. 9, 2015, respectively. The disclosures of the prior applications are hereby incorporated herein in their entirety by reference.

BACKGROUND OF THE INVENTION

1. Field of the Invention

The present invention relates to an image forming system and an image forming method.

2. Description of the Related Art

Conventionally, an image forming apparatus such as an MFP (Multifunction Peripheral) has a power-saving function in which an electric power mode is switched to control the supply of electric power for reducing the consumption of electric power by the image forming apparatus.

Typically, an image forming apparatus includes an operation part (user interface function including an operation panel) and a main body part (image processing function). The operation part and the main body part are managed together as a whole in terms of the power-saving function (see, for example, Japanese Laid-Open Patent Publication No. 2011-182020).

However, further reduction of power can be expected if the electric power mode for the operation part and the electric power mode for the main body part are managed separately in correspondence with each of their conditions.

SUMMARY OF THE INVENTION

The present invention may provide an image forming system and an image forming method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming system and an image forming method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming system including a main body including a first control part that controls an electric power mode of the main body and an engine that executes image processing, and an operation apparatus that receives an operation for instructing the engine to execute the image processing, the operation apparatus including a second control part that controls an electric power mode of the operation apparatus. In a case where the operation apparatus receives an instruction to shift the electric power mode of the main body or the electric power mode of the operation apparatus, the first control part determines whether shifting is possible based on a first process program executed by the main body and controls an electric power supply of the main body according to the determination, and the second control part determines whether shifting is possible based on a second process program executed by the operation apparatus and controls an electric power supply of the operation apparatus according to the determination.

Other objects, features and advantages of the present invention will become more apparent from the following detailed description when read in conjunction with the accompanying drawings.

BRIEF DESCRIPTION OF THE DRAWINGS

FIGS. 10A-10C are schematic diagrams illustrating combinations of statuses of electric power modes of a main body and an operation apparatus;

FIGS. 11A-11C are schematic diagrams illustrating examples of combinations of electric power modes of a main body and an operation apparatus that are to be avoided;

FIG. 13 is a sequence diagram illustrating the flow of a process of resolving a mismatch of electric power modes;

FIG. 19 is a sequence diagram illustrating the flow of a process of resolving a mismatch of electric power modes.

DETAILED DESCRIPTION OF THE PREFERRED EMBODIMENTS

Figure 1A:
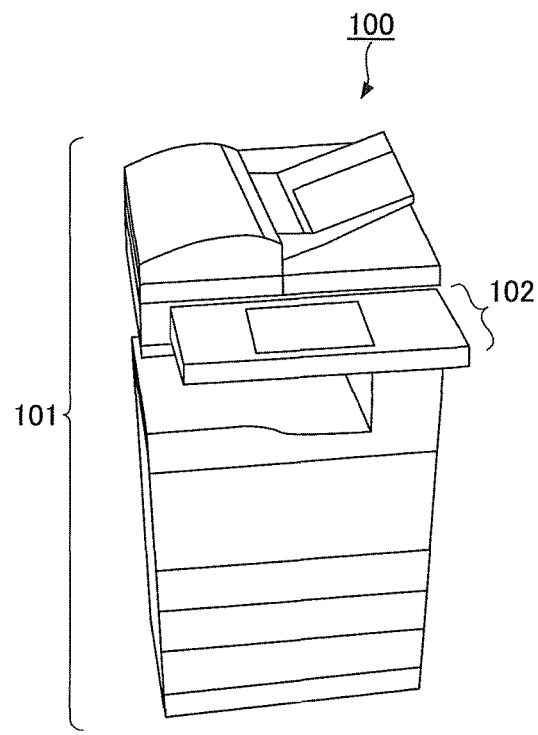
FIG. 1A is a schematic diagram illustrating an entire configuration of an image forming system according to an embodiment of the present invention.

Next, embodiments of the present invention are described with reference to the accompanying drawings. In the description of the embodiments and drawings, like components/parts are denoted with like reference numerals and further description thereof may be omitted.

<First Embodiment>
<Entire Configuration of Image Forming System>

Figure 1B:
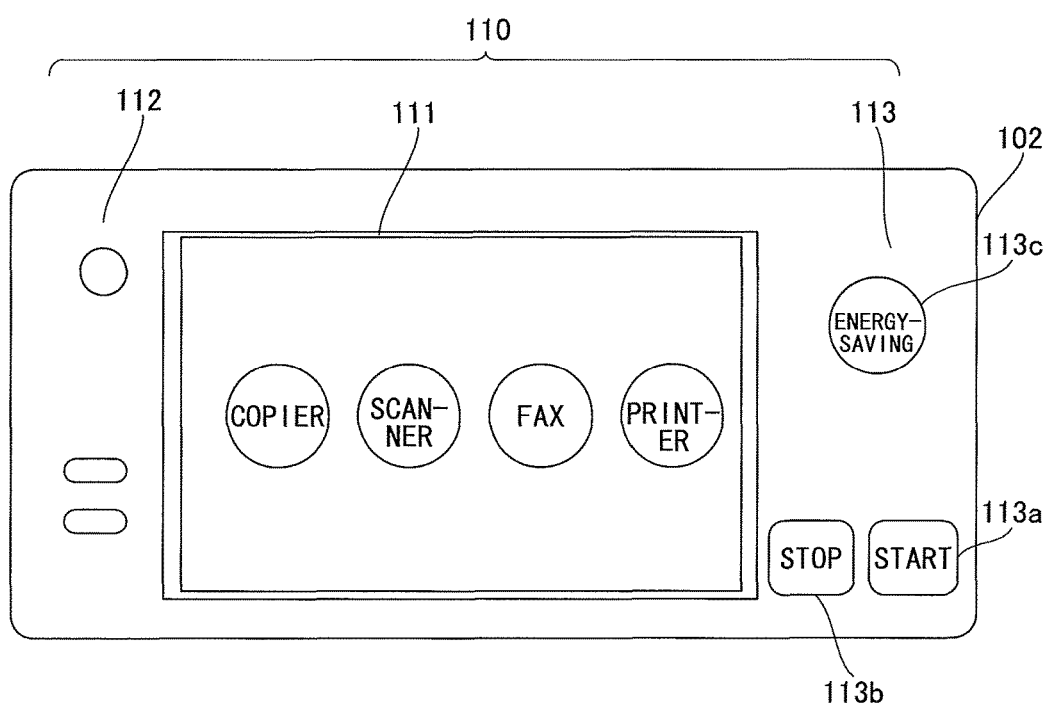
FIG. 1B is a schematic diagram illustrating a configuration of an operation apparatus according to an embodiment of the present invention.

First, an entire configuration of an image forming system 100 according to an embodiment of the present invention is described. FIGS. 1A and 1B are schematic diagrams illustrating an entire configuration of the image forming system 100 and a configuration of an operation apparatus 102 according to an embodiment of the present invention.

As illustrated in FIG. 1A, the image forming system 100 is, for example, an MFP (Multifunction Peripheral) that includes image processing functions such as a copier function, a scanner function, a facsimile function, and a printer function. The image forming system 100 includes a main body 101 and the operation apparatus 102 that is detachably attached to the main body 101.

The main body 101 performs image processing based on the image processing functions in accordance with various operations performed on the operation apparatus 102 by the user.

The operation apparatus 102 is used for enabling the user to perform various operations thereon such as selecting an image processing function, inputting various settings for executing image processing based on an image processing function, inputting an instruction to begin the execution of image processing based on an image processing function, or switching a display screen.

FIG. 1B illustrates the operation apparatus 102 detached from the main body 101. As illustrated in FIG. 1B, the operation apparatus 102 includes an operation panel 110 on which various operations are performed by the user. A display/operation part 111 and hard keys 112, 113 are provided on the operation panel 110. The display/operation part 111 includes a combination of an LCD (Liquid Crystal Display) device 215-1 (see FIG. 2) and a touch panel 215-2 (see FIG. 2).

Various display screens are displayed on the LCD device of the display/operation part 111. In the example illustrated in FIG. 11B, display screens for selecting image processing functions (e.g., copier function, scanner function, facsimile function, printer function) are displayed on the LCD device. In a case where the user selects an image processing function by touching an icon displayed on the LCD device, the touch panel detects the position selected by the user and recognizes the content input by the operation based on the detected position. Then, the main body 101 performs image processing based on an image processing function in accordance with the content recognized by the touch panel.

The hard keys 112, 113 include, for example, a start button 113a for instructing the main body 101 to start image processing based on an image processing function and a stop button 113b for instructing the main body 101 to stop an image processing function. The hard keys 112, 113 also include an energy saving button 113c for shifting the below-described electric power modes of the operation apparatus 102 from a regular mode to a power-saving mode.

Although the image forming system 100 illustrated in FIG. 1A includes only a single operation apparatus 102, the image forming system 100 may include multiple operation apparatuses 102. In this case, not all of the multiple operation apparatuses 102 need to be detachably attached to the main body 101. Further, a portable terminal or the like may be used as the operation apparatus 102 by implementing the function of the operation apparatus 102 with the portable terminal or the like.

<Hardware Configuration of Image Forming System>

Figure 2:
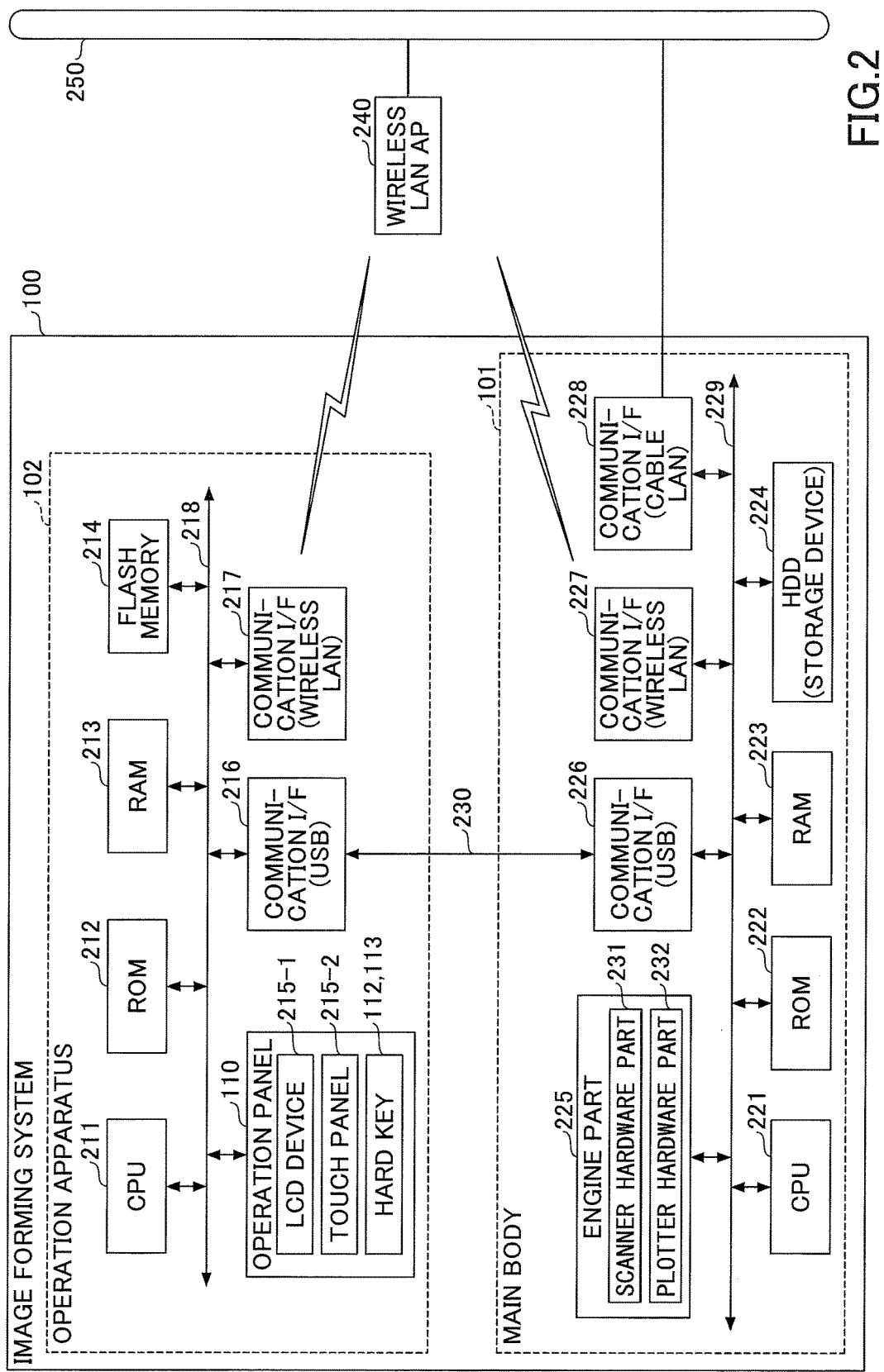
FIG. 2 is a schematic diagram illustrating a hardware configuration of an operation apparatus and a main body according to an embodiment of the present invention.

Next, a hardware configuration of the image forming system 100 including the main body 101 and the operation apparatus 102 according to an embodiment of the present invention is described. FIG. 2 is a schematic diagram illustrating a hardware configuration of the main body 101 and the operation apparatus 102 according to an embodiment of the present invention.

As illustrated in FIG. 2, the operation apparatus 102 of the image forming system 100 includes a CPU (Central Processing Unit, e.g., computer) 211, a ROM (Read Only Memory) 212, a RAM (Random Access Memory) 213, a flash memory 214, an operation panel 110, a communication I/F (interface, e.g., USB (Universal Serial Bus)) 216, and a communication I/F (e.g., wireless LAN (Local Area Network)) 217. Such components included in the operation apparatus 102 are connected to each other by way of a bus 218.

The CPU 211 controls the entire operation apparatus 102 by using the RAM 213 or the like as a work area to execute various programs (e.g., below-described program for switching electric power modes and controlling electric power supply) stored in the ROM 212 or the like.

The flash memory 214 is a non-volatile storage medium that stores various programs (e.g., a program for switching electric power modes and controlling electric power supply, and the below-described first application 301) executed by the CPU 211 and various data.

The operation panel 110 is used for allowing the user to perform various operations thereon. As described above, the operation panel 110 includes the display/operation part 111 (including the combination of the LCD device 215-1 and the touch panel 215-2) and the hard keys 112, 113.

The communication I/F (e.g., USB) 216 is an interface for communicating with the main body 101 via a communication path 230. In this embodiment, the communication I/F 216 is a USB standard interface. It is, however, to be noted that the communication I/F 216 may be other interfaces such as a Bluetooth (registered trademark) standard interface or an IrDA (Infrared Data Association) standard interface.

The communication I/F (e.g., wireless LAN) 217 is an interface for establishing wireless connection with an AP (Access Point) 240 of a wireless LAN and communicating with an external network 250.

The main body 101 of the image forming system 100 includes a CPU (e.g., computer) 221, a ROM 222, a RAM 223, a storage device (e.g., HDD (Hard Disk Drive)) 224, and an engine part 225. Further, a communication I/F (e.g., USB) 226, a communication interface (e.g., wireless LAN) 227, and a communication interface (e.g., cable LAN) 228 are also included in the main body 101. Such components included in the main body 101 are connected to each other by way of a bus 229.

The CPU 221 controls the entire main body 101 by using the RAM 223 or the like as a work area to execute various programs (e.g., below-described program for switching electric power modes and controlling electric power supply) stored in the ROM 222 or the like.

Accordingly, the operation apparatus 102 and the main body 101 included in the image forming system 100 have corresponding CPUs 211, 221, so that the CPU 211 and the CPU 221 independently (separately) execute the program for controlling electric power modes. That is, with the image forming system 100 of this embodiment, the operation apparatus 102 and the main body 101 can independently (separately) execute switching of electric power modes.

The storage device 224 is a non-volatile storage medium that stores various programs (e.g., a program for switching electric power modes and controlling electric power supply, and the below-described second application 311 executed by the CPU 221 and various data.

The engine part 225 includes one or more hardware parts for executing image processing based image processing functions such as a copier function, a scanner function, a facsimile function, and a printer function. The engine part 225 includes, for example, a scanner hardware part 231 for scanning a document and reading data from the document, and a plotter hardware part 232 for printing on a sheet material (e.g., paper). Further, a communication part for performing facsimile communication, a finisher for sorting printed sheet material, or an ADF (Automatic Document Feeder) for automatically feeding a document may also be included in the engine part 225.

The communication I/F (e.g., USB) 226 is an interface for communicating with the operation apparatus 102 via the communication path 230. In this embodiment, the communication I/F 226 is a USB standard interface. It is, however, to be noted that the communication I/F 226 may be other interfaces such as a Bluetooth (registered trademark) standard interface or an IrDA (Infrared Data Association) standard interface.

The communication I/F (e.g., wireless LAN) 227 is an interface for establishing wireless connection with an AP (Access Point) 240 of a wireless LAN and communicating with an external network 250.

<Functions of Image Forming System>

Next, functions pertaining to an electric power-saving function (function for switching electric power modes and controlling electric power supply) of the image forming system 100 are described. Among the many functions included in the operation apparatus 102 and the main body 101, FIGS. 3A and 3B schematic diagram illustrate a functional configuration pertaining to a power-saving function included in each of the operation apparatus 102 and the main body 101.

In this embodiment, each of the operation apparatus 102 and the main body 101 has electric power modes including a regular mode and a power-saving mode. The regular mode of the operation apparatus 102 is a state where electric power is supplied to all of the power supply destinations inside the operation apparatus 102. The regular mode of the main body 101 is a state where electric power is supplied to all of the power supply destinations inside the main body 101. On the other hand, the power-saving mode of the operation apparatus 102 is a state where the supply of power to a part of the power supply destinations is cut off by controlling the power supply inside the operation apparatus 102. That is, in a case where the electric power mode of the operation apparatus 102 is in a power-saving mode, the amount of power consumption is reduced compared to a case where the electric power mode of the operation apparatus 102 is in a regular mode. Further, the power-saving mode of the main body 101 is a state where the supply of power to a part of the power supply destinations is cut off by controlling the power supply inside the main body 101. That is, in a case where the electric power mode of the main body 101 is in a power-saving mode, the amount of power consumption is reduced compared to a case where the electric power mode of the main body 101 is in a regular mode.

Figure 3A:
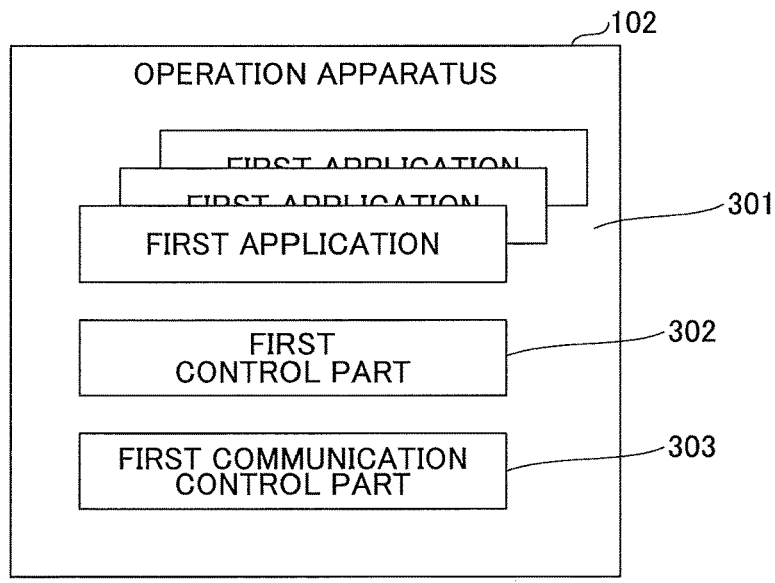
FIGS. 3A and 3B are functional diagrams illustrating functions pertaining to a power-saving function.

As illustrated in FIG. 3A, the functional parts (functions) related to the power-saving function of the operation apparatus 102 include a process program such as a first application 301, a first control part 302, and a first communication control part 303. The process program may include any given software besides an application.

The first application 301 may include multiple applications. Each first application 301 provides a user interface to the operation panel 110 and displays a display screen by way of the LCD device 215-1. In addition, each first application 310 receives (accepts) various operations input by the user via the touch panel 215-2. The first application 301 may include an application that requires communication with the main body 101 when being executed and an application that does not require communication with the main body 101 when being executed. That is, the first application 301 includes an application that can be executed regardless of the electric power mode of the main body 101 and an application that is executed in accordance with the electric power mode of the main body 101.

The first control part 302 is implemented by the CPU 211 that executes a program for switching the electric power mode of the operation apparatus 102 and controlling the power supply of the operation apparatus 102. In a case where a predetermined condition is satisfied, a case where the user performs a shifting operation on the operation apparatus 102, or a case where the operation apparatus 102 receives a shifting notice from the main body 101, the first control part 302 switches the electric power mode of the operation apparatus 102 and controls the power supply of the operation apparatus 102. Upon switching the electric power mode of the operation apparatus 102, the first control part 302 determines whether the switching of the electric power mode is possible by inquiring the first application 301. Further, the first control part 302 transmits an instruction for shifting the electric power mode (shifting instruction) to the main body 101 via the first communication control part 303 to instruct the main body 101 to shift the electric power mode of the main body 101.

The first communication control part 303 transmits the shifting instruction to the main body 101. Further, in a case where the main body 101 transmits a notice of shifting the electric power mode (shifting notice) to the operation apparatus 102, the first communication control part 303 receives the shifting notice transmitted from the main body 101.

Figure 3B:
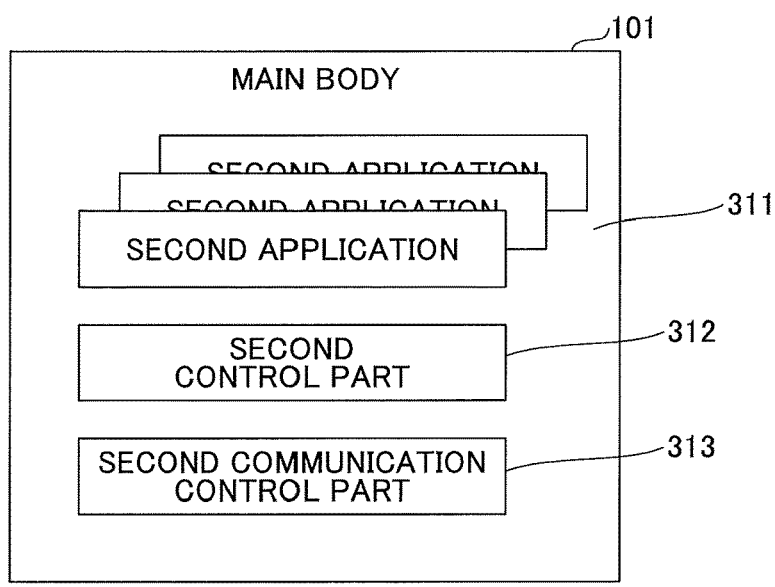

As illustrated in FIG. 3B, the functional parts (functions) related to the power-saving function of the main body 101 include a process program such as a second application 311, a second control part 312, and a second communication control part 313. The process program may include any given software besides an application.

The second application 311 may include multiple applications. The second application 311 may include an application that requires communication with the operation apparatus 102 when being executed and an application that does not require communication with the operation apparatus 102 when being executed. That is, the second application 311 includes an application that can be executed regardless of the electric power mode of the operation apparatus 102 and an application that is executed in accordance with the electric power mode of the operation apparatus 102.

The second control part 312 is implemented by the CPU 221 that executes a program for switching the electric power mode of the main body 101 and controlling the power supply of the main body 101. In a case where a predetermined condition is satisfied, a case where the user performs a shifting operation on the operation apparatus 102, or a case where the main body 101 receives a shifting notice from the operation apparatus 102, the second control part 312 switches the electric power mode of the main body 101 and controls the power supply of the main body 101. Upon switching the electric power mode of the main body 101, the second control part 312 determines whether the switching of the electric power mode is possible by inquiring the second application 311. Further, the second control part 312 transmits an instruction for shifting the electric power mode (shifting instruction) to the operation apparatus 102 via the second communication control part 313 to instruct the main body 101 to shift the electric power mode of the main body 101.

The second communication control part 313 receives the shifting instruction from the operation apparatus 102. Further, the second communication control part 313 transmits the shifting notice to the operation apparatus 102.

<Priority Modes when Switching Electric Power Modes>

Figure 4:
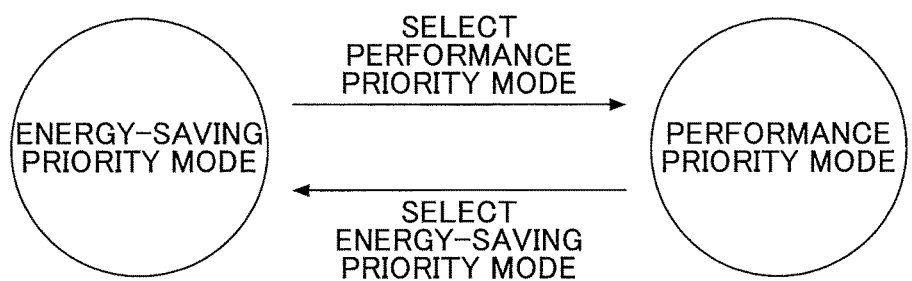
FIG. 4 is a schematic diagram illustrating priority modes for switching electric power modes.

Next, priority modes that are used when switching an electric power mode are described. FIG. 4 is a schematic diagram illustrating the priority modes that are used when switching an electric power mode. As illustrated in FIG. 4, the priority modes include an energy-saving mode and a performance priority mode.

The "energy-saving priority mode" is a mode of shifting to a regular mode after inquiring the second application 311 of the main body 101 whether shifting to the regular mode is possible (i.e., whether shifting to another mode is possible) when attempting to shift from the power-saving mode to the regular mode. In a case where the energy-saving priority mode is selected, power consumption can be further reduced.

On the other hand, the "performance priority mode" is a mode of shifting to a regular mode without having to inquire the second application 311 of the main body 101 whether shifting to the regular mode is possible when attempting to shift from the power-saving mode to the regular mode. In a case where the performance priority mode is selected by the user, an image process can be executed according to the image processing function in a shorter time. That is, the performance priority mode is a mode that prioritizes the speed of shifting to the regular mode.

<Shifting Process to Power-saving Mode>

Figure 5:
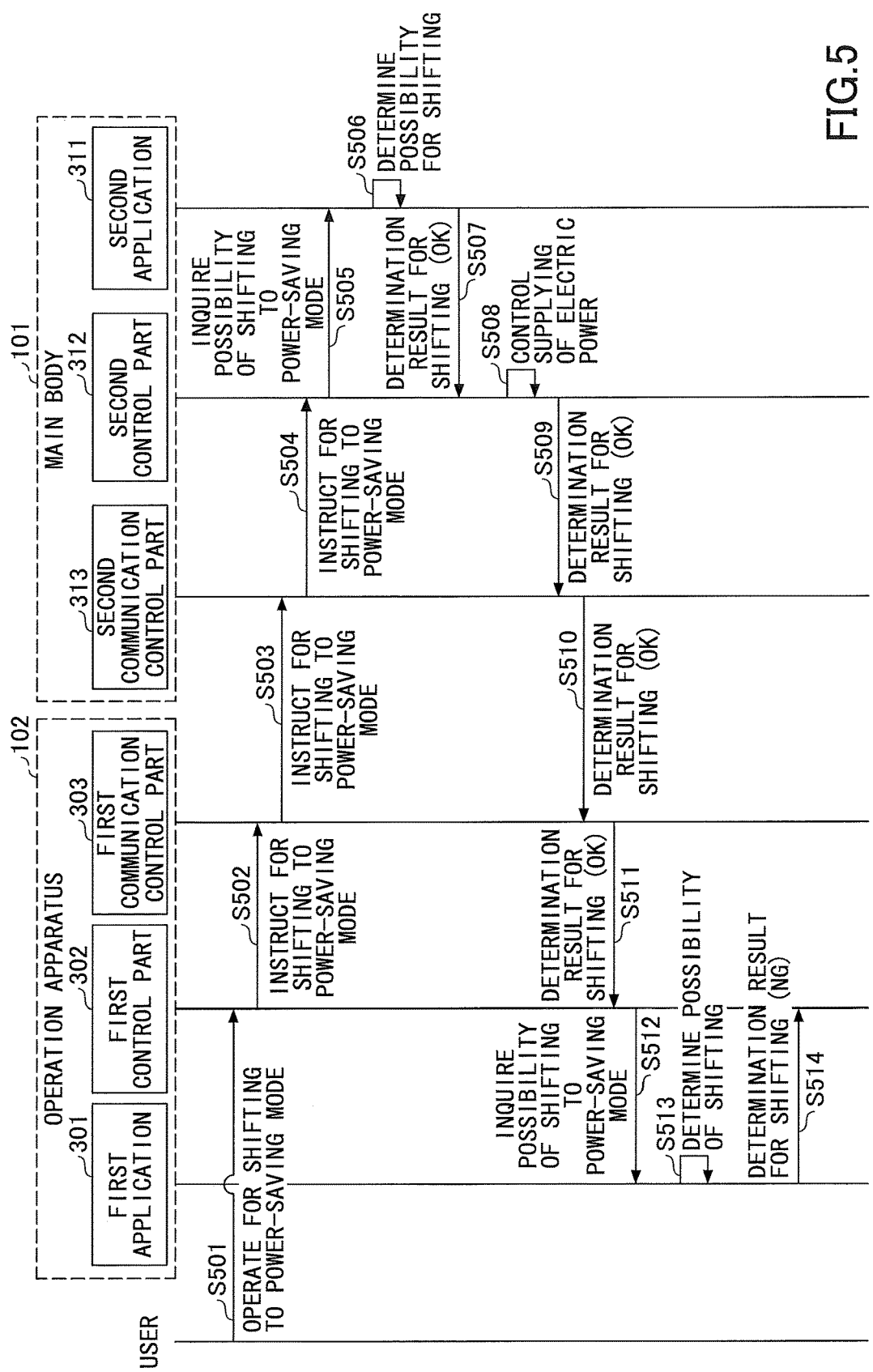
FIG. 5 is a sequence diagram illustrating a flow of an operation for shifting to a power-saving mode.

Next, a shifting process to a power-saving mode by the image forming system 100 according to an embodiment of the present invention is described. FIG. 5 is a sequence diagram illustrating the flow of the shifting process to the power-saving mode by the image forming system 100 according to an embodiment of the present invention.

In Step S501, the user performs an operation for shifting (shifting operation) to the power-saving mode. For example, the user presses an energy-save button 113c of the operation apparatus 102. In Step S502, the control part 302 of the operation apparatus 102 notifies an instruction of shifting to the power-saving mode to the first communication control part 303 in response to the user's shifting operation.

In Step S503, the first communication control part 303 of the operation apparatus 102 transmits an instruction of shifting to the power-saving mode to the second communication control part 313 of the main body 101. In Step S504, the second communication control part 313 of the main body 101 notifies an instruction of shifting to the power-saving mode to the second control part 312.

In Step S505, the second control part 312 of the main body 101 inquires whether shifting to the power-saving mode is possible to the second application 311. In Step S506, the second application 311 determines whether shifting to the power-saving mode is possible. In Step S507, if the second application 311 determines that shifting to the power-saving mode is possible, the second application 311 transmits a result of the determination of the shifting (OK) to the second control part 312.

In Step S508, the second control part 312 that has received the determination result (OK) controls the power supply inside the main body 101, so that the main body 101 shifts to the power-saving mode. Further, in Step S509, the second control part 312 notifies the result of the determination of the shifting (OK) as a shifting report to the second communication control part 313.

In Step S510, the second communication control part 313 of the main body 101 transmits the result of the determination of the shifting (OK) to the first communication control part 303 of the operation apparatus 102. Further, in Step S511, the first communication control part 303 of the operation apparatus 102 notifies the result of the determination of the shifting (OK) to the first control part 302.

In Step S512, the first control part 302 that has received the result of the determination of the shifting (OK) inquires whether shifting to the power-saving mode is possible to the first application 301.

Accordingly, with the image forming system 100 according to an embodiment of the present invention, the operation apparatus 102 and the main body 101 execute the shifting to the power-saving mode independently. Therefore, upon receiving an operation for shifting to the power-saving mode by the user, the main body 101 can be shifted to the power-saving mode even in a case where the operation apparatus 102 determines that shifting to the power-saving mode is not possible.

<Operation of Shifting to Regular Mode (Part 1)>

Figure 6:
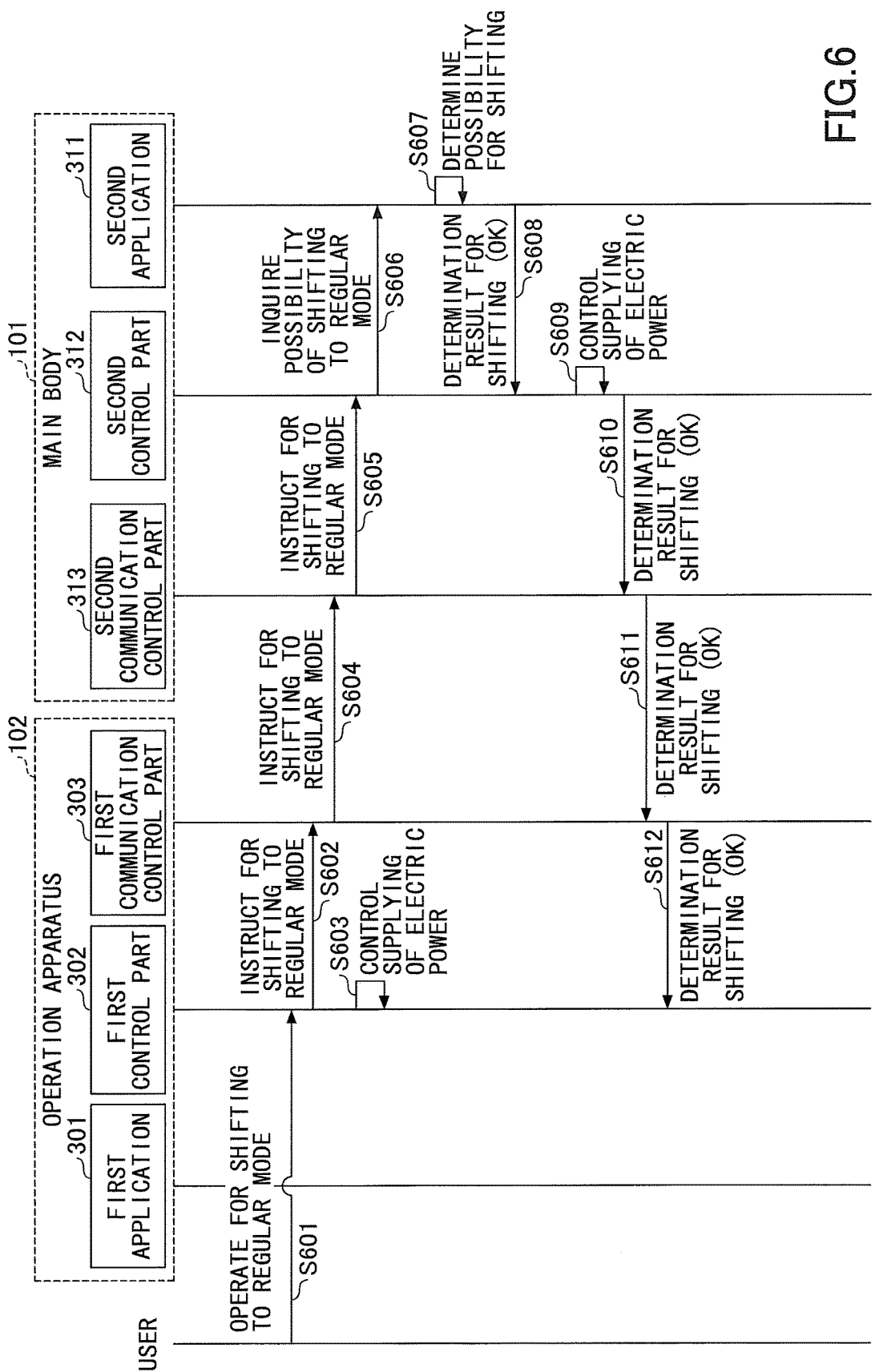
FIG. 6 is a sequence diagram illustrating a flow of an operation for shifting to a regular mode.

Next, an operation of shifting to a regular mode with the image forming system 100 according to an embodiment of the present invention is described. In this embodiment, the power-saving priority mode is selected. FIG. 6 is a sequence diagram illustrating the flow of an operation of shifting to a regular mode by the image forming system 100 in a case where the power-saving priority mode is selected.

In Step 601, the user performs an operation for shifting (shifting operation) to a regular mode. More specifically, the user either touches the display/operation part 111 of the operation apparatus 102 or presses the hard keys 112, 113 of the operation apparatus 102.

In Step S602, the control part 302 of the operation apparatus 102 notifies an instruction of shifting to the regular mode to the first communication control part 303 in response to the user's shifting operation. Then, in Step S602, the first control part 302 of the operation apparatus 102 controls the power supply inside the operation apparatus 102, so that power is supplied to all of the power supply destinations inside the operation apparatus 102. Thereby, the electric power mode of the operation apparatus 102 shifts to the regular mode.

In Step S604, the first communication control part 303 of the operation apparatus 102 transmits an instruction of shifting to the regular mode to the second communication control part 313 of the main body 101. In Step S605, the second communication control part 313 of the main body 101 notifies an instruction of shifting to the regular mode to the second control part 312.

In Step S606, the second control part 312 of the main body 101 inquires whether shifting to the regular mode is possible to the second application 311. In Step S607, the second application 311 determines whether shifting to the regular mode is possible. In Step S608, if the second application 311 determines that shifting to the regular mode is possible, the second application 311 transmits a result of the determination of the shifting (OK) to the second control part 312.

In Step S609, the second control part 312 that has received the result of the determination of the shifting (OK) controls the power supply inside the main body 101, so that power is supplied to all of the power supply destinations inside the main body 101. Thereby, the electric power mode of the main body 101 shifts to the regular mode. Further, in Step S610, the second control part 312 notifies the result of the determination of the shifting (OK) as a shifting report to the second communication control part 313.

In Step S611, the second communication control part 313 of the main body 101 transmits the result of the determination of the shifting (OK) to the first communication control part 303 of the operation apparatus 102. Further, in Step S612, the first communication control part 303 of the operation apparatus 102 notifies the result of the determination of the shifting (OK) to the first control part 302. Thereby, the first control part 302 recognizes that the electric power mode of the main body 101 has shifted to the regular mode.

Accordingly, with the image forming system 100 according to an embodiment of the present invention, the operation apparatus 102 and the main body 101 execute the shifting to the regular mode independently. Therefore, upon receiving an operation for shifting to the regular mode by the user, the power mode of the operation apparatus 102 can be immediately shifted to the regular mode. Meanwhile, the power mode of the main body 101 can be shifted in accordance with the result of the inquiry to the second application 311.

<Operation of Shifting to Regular Mode (Part 2)>

Figure 7:
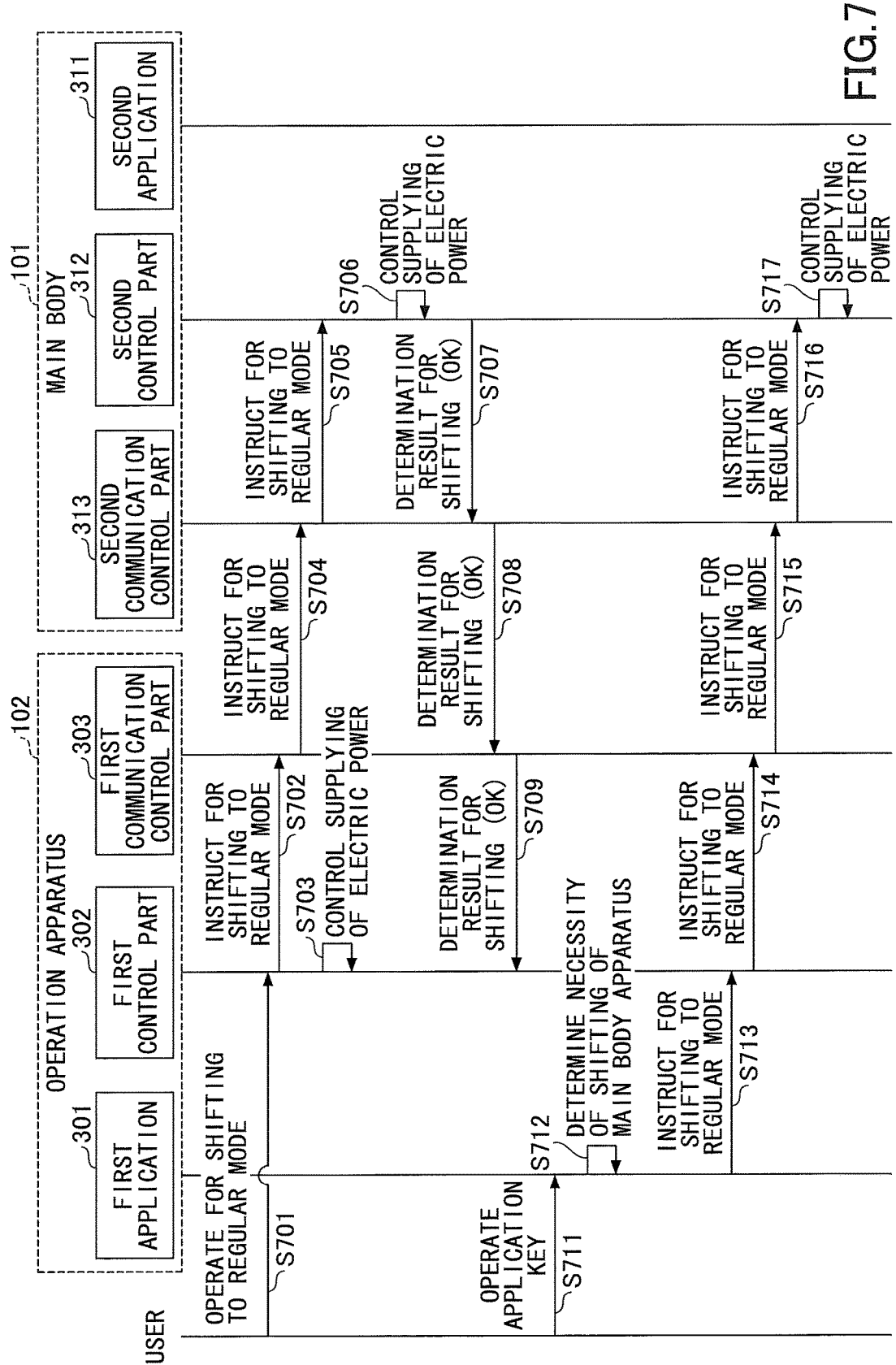
FIG. 7 is a sequence diagram illustrating a flow of an operation for shifting to a regular mode.

Next, an operation of shifting to a regular mode with the image forming system 100 according to another embodiment of the present invention is described. In this embodiment, the performance priority mode is selected. FIG. 7 is a sequence diagram illustrating the flow of an operation of shifting to a regular mode by the image forming system 100 in a case where the performance priority mode is selected.

In Step S701, the user performs an operation for shifting (shifting operation) to the regular mode. More specifically, the user either touches the display/operation part 111 of the operation apparatus 102 or presses the hard keys 112, 113 of the operation apparatus 102.

In Step S702, the control part 302 of the operation apparatus 102 notifies an instruction of shifting to the regular mode to the first communication control part 303 in response to the user's shifting operation. Then, in Step S703, the first control part 302 of the operation apparatus 102 controls the power supply inside the operation apparatus 102, so that power is supplied to all of the power supply destinations inside the operation apparatus 102. Thereby, the electric power mode of the operation apparatus 102 shifts to the regular mode.

In Step S704, the first communication control part 303 of the operation apparatus 102 transmits an instruction of shifting to the regular mode to the second communication control part 313 of the main body 101. In Step S705, the second communication control part 313 of the main body 101 notifies an instruction of shifting to the regular mode to the second control part 312.

In Step S706, the second control part 312 controls the power supply inside the main body 101, so that power is supplied to all of the power supply destinations inside the main body 101. Thereby, the electric power mode of the main body 101 shifts to the regular mode. Further, in Step S707, the second control part 312 notifies the result of the determination of the shifting (OK) as a shifting report to the second communication control part 313.

In Step S708, the second communication control part 313 of the main body 101 transmits the result of the determination of the shifting (OK) to the first communication control part 303 of the operation apparatus 102. Further, in Step S709, the first communication control part 303 of the operation apparatus 102 notifies the result of the determination of the shifting (OK) to the first control part 302. Thereby, the first control part 302 recognizes that the electric power mode of the main body 101 has shifted to the regular mode.

Accordingly, with the image forming system 100 according to an embodiment of the present invention, in a case where the performance priority mode is selected, the main body 101 can also shift the power mode to the regular mode without having to inquire the second application 311. Therefore, the user can immediately instruct the execution an image process according to the image processing function.

In the above-described embodiments, the operation apparatus 102 always transmits an instruction for shifting the regular mode to the main body 101 when the user operates the operation apparatus 102 to shift to the regular mode. Alternatively, however, even in a case where the user operates the operation apparatus 102 to shift to the regular mode, the power mode of the main body 101 does not necessarily need to be shifted to the regular mode.

For example, the following describes a case where the user operates the operation apparatus 102 to shift to the regular mode for activating the first application 301 of the operation apparatus 102. In this case, if the first application 301 is an application that does not need to communicate with the main body 10, the main body 101 does not need to shift the power mode to the regular mode to begin with. Therefore, in a case where the user's operation for shifting to the regular mode is an instruction to activate the first application, it is preferable to determine the type of the first application instructed for activation and transmit the instruction for shifting to the regular mode according to necessity based on the determination.

The shifting operation illustrated as Steps S711 to S717 in FIG. 7 indicate a shifting operation that is performed when a user operates the operation apparatus 102 for shifting to the regular mode by instructing that an application be activated.

In Step S711, the user inputs an instruction to activate the first application. More specifically, the user inputs the instruction to activate the first application by tapping on the display/operation part 111 of the operation apparatus 102.

In Step S712, the operation apparatus 102 determines whether the power mode of the main body 101 is required to be shifted to the regular mode by activating the first application 301 and determining whether communication with the main body 101 is required. In a case where communication with the main body 101 is not required, the operation apparatus 102 determines that the electric power mode of the main body 101 is not required to be shifted to the regular mode. In this case, an instruction to shift to the regular mode is not transmitted to the main body 101.

In a case where communication with the main body 101 is required, the operation apparatus 102 determines that the electric power mode of the main body 101 is to be shifted to the regular mode. Then, in Step S713, the first application 301 notifies an instruction for shifting to the regular mode to the first control part 302.

In Step S714, the first control part 302 of the operation apparatus 102 notifies an instruction for shifting to the regular mode to the first communication control part 303.

In Step S715, the first communication control part 303 of the operation apparatus 102 transmits an instruction for shifting to the regular mode to the second communication control part 313 of the main body 101. In Step S716, the second communication control part 313 of the main body 101 notifies an instruction for shifting to the regular mode to the second control part 312.

In Step S717, the second control part 312 supplies power to all of the power supply destinations in the main body 101. Thereby, the electric power mode of the main body 101 shifts to the regular mode.

Hence, with the image forming system 100 according to the above-described embodiment, the operation apparatus 102 and the main body 101 separately perform the switching of the electric power mode. Thereby, the electric power consumed by the image forming system 100 can be further reduced.

<Second Embodiment>

In the above-described first embodiment, the operation apparatus 102 transmits an instruction to shift to a power-saving mode to the main body 101 when the user performs an operation of shifting to the power-saving mode. However, the instruction to shift to the power-saving mode may be transmitted in accordance with the settings of an application inside the operation apparatus 102. Next, a second embodiment of the present invention is described. It is to be noted that features that are different from the features of the first embodiment are mainly described.

<Shifting Process to Power-Saving Mode>

Figure 8:
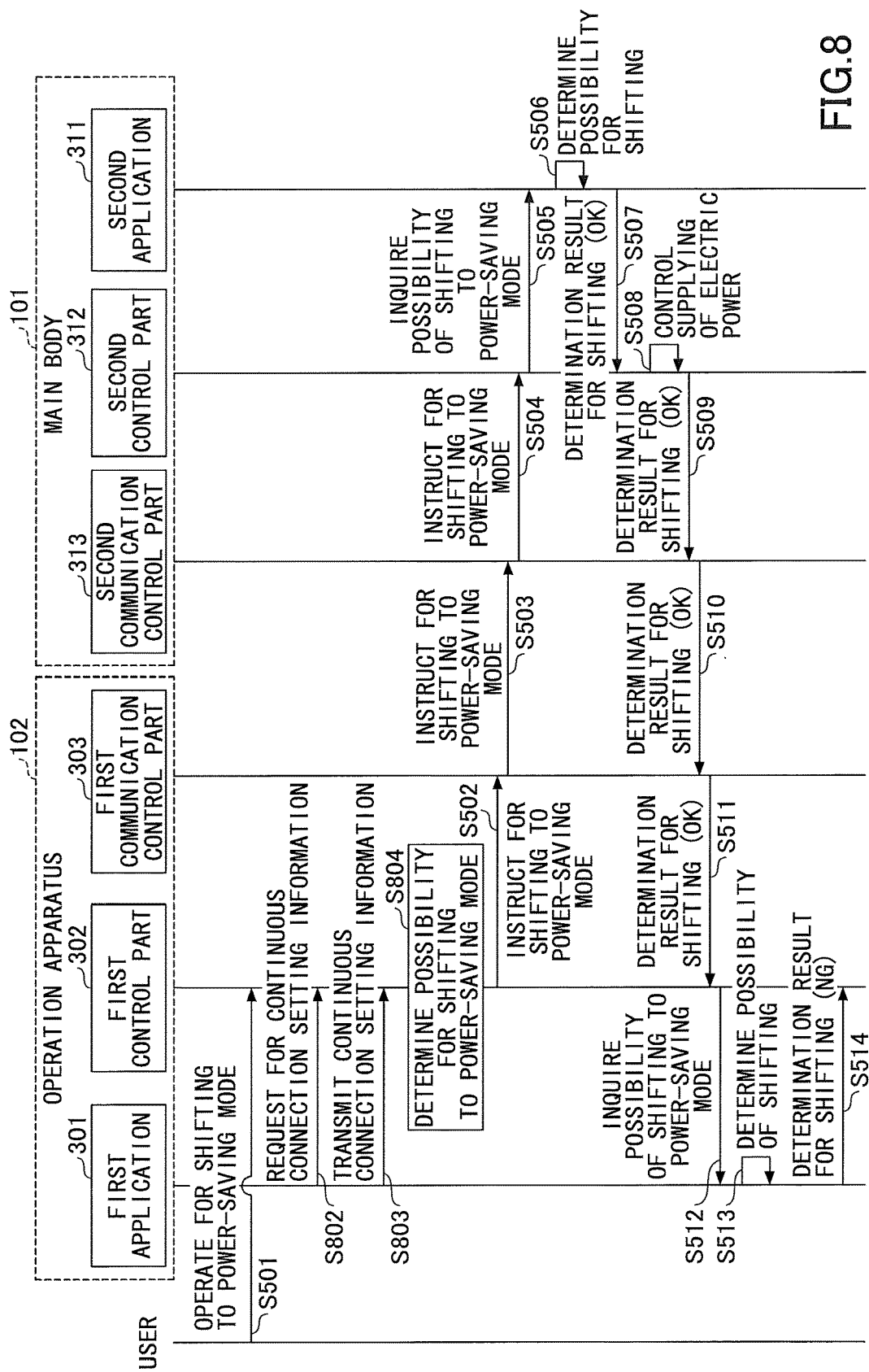
FIG. 8 is a sequence diagram illustrating a flow of an operation for shifting to a power-saving mode.

First, a shifting process to a power-saving mode by the image forming system 100 according to the second embodiment of the present invention is described. FIG. 8 is a sequence diagram illustrating the flow of the shifting process to the power-saving mode by the image forming system 100 according to the second embodiment of the present invention.

When the user performs an operation to shift to the power-saving mode in Step S501, the first control part 302 requests for continuous connection setting information to the first application in Step S802. In this embodiment, the first application 301 is a setting application that can be set with a setting that prohibits the operation apparatus 102 to shift the electric power mode of the operation apparatus 102 to the power-saving mode.

In Step S803, the first application 301 that has received the request for continuous connection setting information transmits continuous connection setting information to the first control part 302.

In Step S804, the first control part 302 performs a power-saving mode shift determination process to determine whether shifting to the power-saving mode is possible. The power-saving mode determination process (step S804) is described in further detail with reference to FIG. 9.

If the first control part 302 determines that shifting to the power-saving mode is possible, the processes of Steps S502 to S514 are executed. Because the processes of Steps S502 to S504 have been described above with reference to FIG. 5, further description thereof is omitted.

<Process of Determining the Shifting to Power-saving Mode>

Figure 9A:
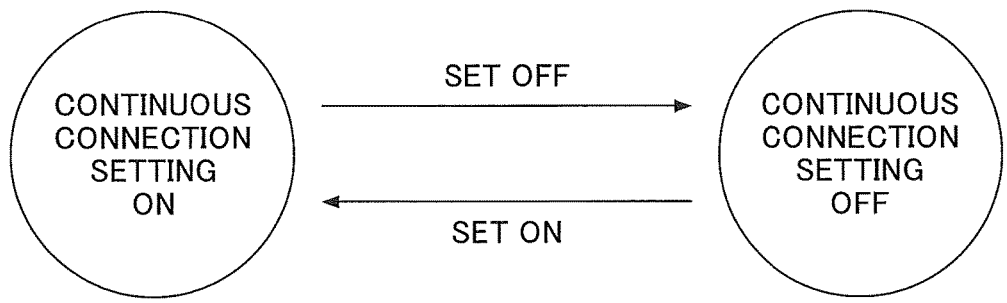
FIGS. 9A and 9B are schematic diagrams for describing an operation for determining whether to shift to a power-saving mode.
Figure 9B:
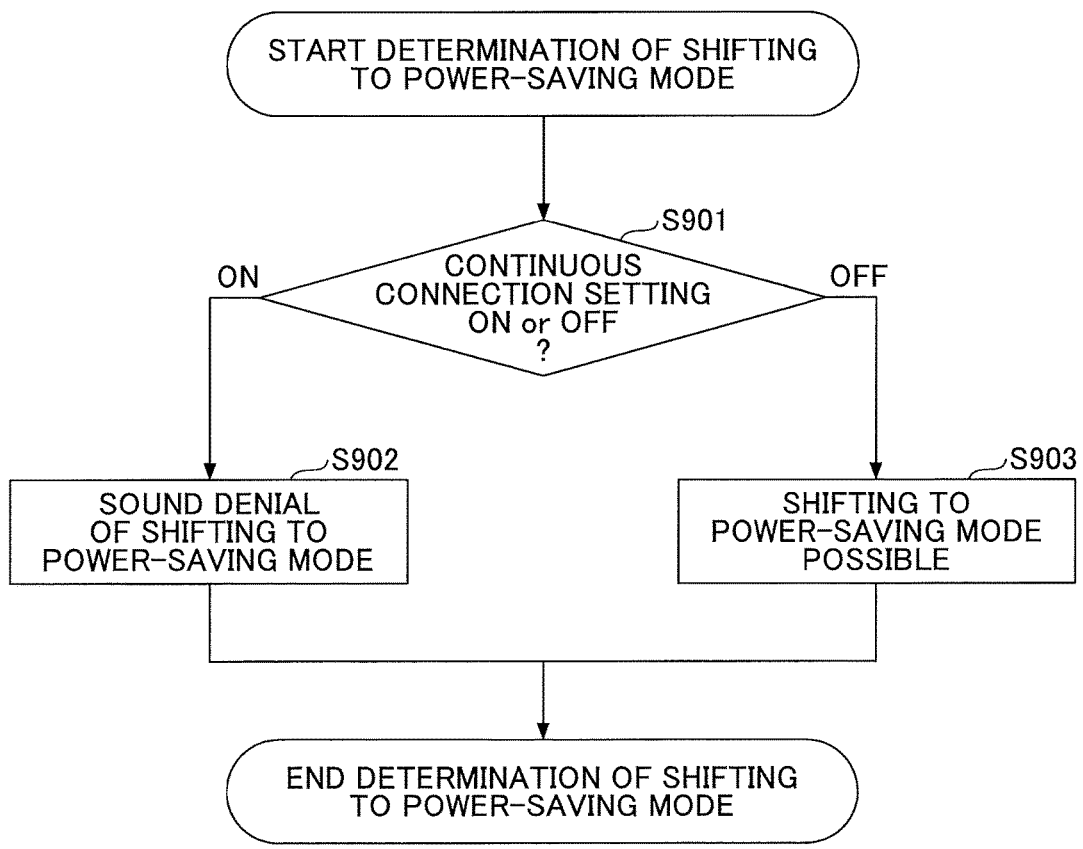

Next, the process of determining the shifting to the power-saving mode in Step S805 of FIG. 8 is described. FIGS. 9A and 9B are schematic diagrams for describing the power-saving mode shifting determination process according to an embodiment of the present invention. FIG. 9A illustrates the settings of the first application 301 for prohibiting the operation apparatus 102 from shifting to the power-saving mode. As illustrated in FIG. 9A, continuous connection setting information such as "ON" and "OFF" can be set to the first application 301. In a case where "ON" is set as the continuous electric power setting information, the electric power mode of the operation apparatus 102 does not shift to the power-saving mode. Further, the operation apparatus 102 does not transmit an instruction to shift to the power-saving mode to the main body 101.

FIG. 9B is a flowchart illustrating a detailed flow of the power-saving mode shifting determination process (Step S804) in which the first control part 302 determines whether the shifting to the power-saving mode is possible according to the continuous connection setting information transmitted from the first application 301.

In Step S901, the first control part 302 determines whether the continuous connection setting information received from the first application 301 is "ON" or "OFF". In a case where the continuous connection setting information is determined to be "ON", the process proceeds to Step S902.

In Step S902, the first control part 302 determines that the shifting to the power-saving mode is prohibited and rings a power-saving mode shifting denial sound. Thereby, the user recognizes the operation apparatus 102 is set to prohibit the shifting to the power-saving mode. In this case, the instruction to shift to the power-saving mode is not transmitted to the main body 101.

On the other hand, in a case where the continuous connection setting information is determined to be "OFF" in Step S901, the process proceeds to Step S903. In Step S903, the first control part 302 determines that the shift to the power-saving mode is possible. In this case, the process proceeds to Step S502, so that an instruction to shift to the power-saving mode is transmitted to the main body 101.

With this embodiment, the user can set the operation apparatus 102 to prohibit shifting to the power-saving mode even in the image forming system 100 having a power-saving function.

<Third Embodiment>

In the first and second embodiments, only the regular and the power-saving modes in the main body 101 and the operation apparatus 102 are described. However, power supply destinations are typically divided into groups, and the supplying/ceasing of electric power are controlled in correspondence with each group. That is, the power-saving modes may be classified into various "statuses" depending on the amount of consumption power that is reduced.

For example, in a case where the main body 101 and the operation apparatus 102 perform the switching of electric power modes independently, the convenience for the user may be degraded depending on the combination of the electric power mode (status) of the main body 101 and the electric power mode (status) of the operation apparatus 102.

Therefore, the image forming system 100 according to the third embodiment of the present invention controls the combination of the electric power modes (status) of the operation apparatus 102 and the main body 101 to avoid a particular combination from occurring or to resolve the occurrence of the particular combination. The image forming system 100 according to the third embodiment of the present invention is described in detail below.

<Electric Power Modes of Main Body and Operation Apparatus>

First, the statuses of the electric power modes of the main body 101 and the operation apparatus 102 are described. FIGS. 10A-10C are schematic diagrams illustrating combinations of the statuses of the electric power modes of the main body 101 and the operation apparatus 102 according to an embodiment of the present invention.

As illustrated in FIGS. 10A-10C, the regular mode of the main body 101 includes a "standby state". The term "standby state" is a state where electric power is supplied to all of the power supply destinations inside the main body 101, and the main body is standing by (waiting) for image processing to be started according to the image processing function (i.e., a state where image processing according to the image process function has not yet started).

Further, the power-saving mode of the main body 101 includes a "low power state", a "silent state", an "engine off state", and an "STR (Suspended To Ram) state". The "low power state" is a state in which the main body 101 can immediately shift to the standby state. In this standby state, the temperature of a fixing heater used for executing the image processing is in a lowered state.

In addition to the "low power state", the "silent state" is a state in which power is prevented from being supplied to a fan or the like (not illustrated) provided in the main body 101. In addition to the "low power state" and the "silent state", the "engine off state" is a state in which power is prevented from being supplied to the engine part 225. In addition to the "lower power state", the "silent state", and the "engine off state", the "STR state" is a state in which power is prevented from being supplied to the CPU 221, HDD 224, or the like while data such as the present settings of the main body 101 are maintained in the RAM 223.

On the other hand, the regular mode of the operation apparatus 102 includes an "LCD ON state". The "LCD ON state" is a state in which power is supplied to all of the power supply destinations in the operation apparatus 102. That is, the "LCD ON state" is a state in which power is supplied even to the LCD device 215-1 included in the operation panel 110.

Further, the power-saving mode of the operation apparatus 102 also includes an "LCD OFF state" and a "sleep state". The "LCD OFF state" is a state in which power is prevented from being supplied to the LCD device 215-1 included in the operation panel 110. In addition to the "LCD OFF state", the "sleep state" is a state in which power is prevented from being supplied to the CPU 211, the flash memory 214, or the like while data such as the present settings of the main body 101 are maintained in the RAM 223.

The dotted line 1000 of FIG. 10A illustrates a combination of statuses of the electric power modes of the main body 101 and the statuses of the electric power modes of the operation apparatus 102. In a case where the regular mode of the operation apparatus 102 is the "LCD ON state", the status of the main body 101 is to be the "standby state" of the regular mode or one of the "low power state", the "silent state", and the "engine off state" of the power-saving mode.

The dotted line 1010 of FIG. 10B illustrates another combination of statuses of the electric power modes of the main body 101 and the statuses of the electric power modes of the operation apparatus 102. In a case where the power-saving mode of the operation apparatus 102 is the "LCD OFF state", the status of the main body 101 is to be one of the "low power state", the "silent state", and the "engine off state" of the power-saving mode.

The dotted line 1020 of FIG. 10C illustrates another combination of statuses of the electric power modes of the main body 101 and the statuses of the electric power modes of the operation apparatus 102. In a case where the power-saving mode of the operation apparatus 102 is the "sleep state", the status of the main body 101 is to be the "engine off state" or the "STR state" of the power-saving mode.

Among the combination of statuses of the electric power modes of the main body 101 and the operation apparatus 102, FIGS. 11A-11C illustrate examples of combinations that are to be avoided.

As illustrated in FIG. 11A, supposing that the main body 101 shifts to the "standby state" of the regular mode in accordance with the shifting operation of the user in a state where the power-saving mode of the operation apparatus 102 is in the "sleep mode" as illustrated in FIG. 11A.

In this case, the main body 101 is in a state capable of immediately executing image processing based on the image process function. On the other hand, the user is to perform a predetermined operation on the operation apparatus 102 in order to shift the electric power mode of the operation apparatus 102 from the "sleep state" of the power-saving mode to the "LCD ON state" of the regular mode. This may be inconvenient for the user in the case of executing image processing based on the image processing function. When such a combination is generated, the image forming system 100 is desired to automatically avoid such combination.

In the following, this situation where one electric power mode of the main body 101 or the operation apparatus 102 shifts according to a user's shifting operation but does not match to another electric power mode of the main body 101 or the operation apparatus 102 is referred to as a "mismatch of electric power modes".

FIGS. 11B and 11C illustrate other examples of the mismatch of electric power modes. FIG. 11B illustrates a case where the user's shifting operation causes the operation apparatus 102 to shift to the "LCD ON state" of the regular mode while the main body 101 is shifting to the "STR state" of the power-saving mode.

Further, FIG. 11C illustrates a case where the user's shifting operation causes the main body 101 to shift to the "standby state" of the regular mode while the operation apparatus 102 is shifting to the "LCD OFF state" of the power-saving mode.

Similar to the case of FIG. 11A, the cases illustrated in FIGS. 11B and 11C may be inconvenient for the user because the user would need to further perform a predetermined operation on the operation apparatus 102 in order for image processing to be executed based on the image processing function.

Therefore, the image forming system 100 of this embodiment detects a mismatch of electric power modes and automatically resolves the mismatch for improving the convenience of the user. In this embodiment, a process for resolving the mismatch between the electric power modes of the main body 101 and the electric power modes of the operation apparatus 102 is referred to as "process of resolving mismatch of electric power modes".

<Process of Resolving Mismatch of Electric Power Modes (1)>

Figure 12A:
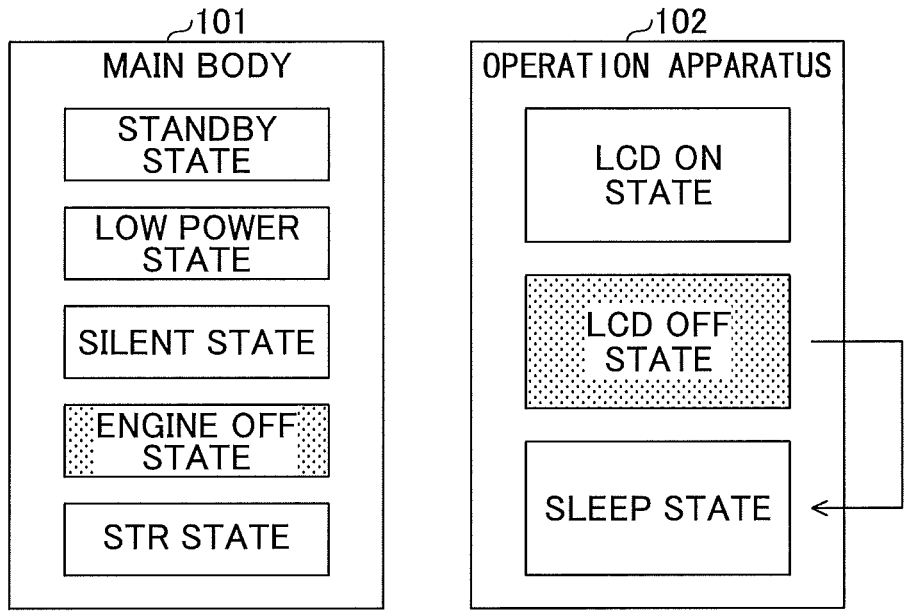
FIGS. 12A and 12B are schematic diagrams illustrating a first example for describing execution of a process of resolving a mismatch of electric power modes.
Figure 12B:
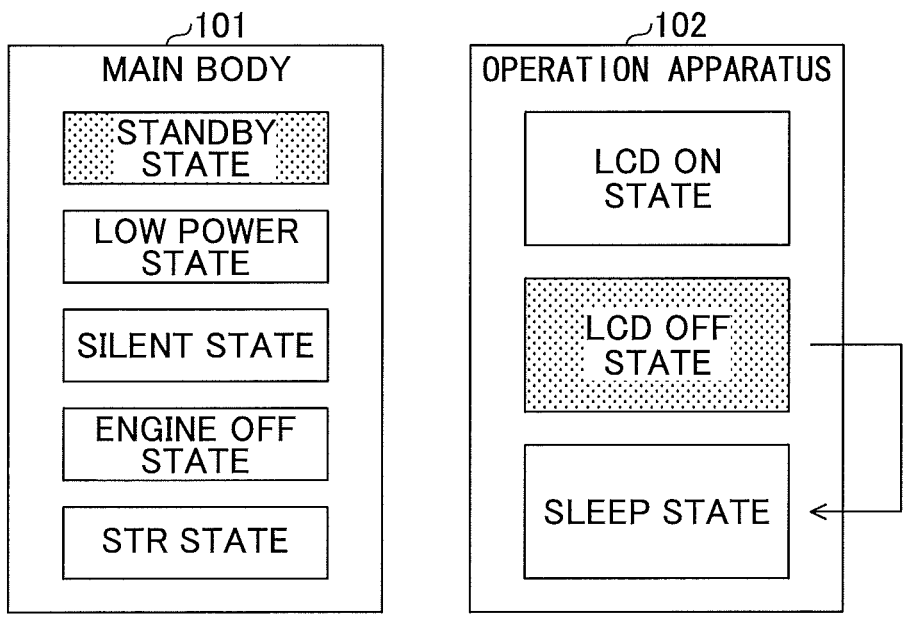

Next, a detailed example of the process of resolving a mismatch of electric power modes is described. FIGS. 12A and 12B are schematic diagrams illustrating a first example for describing the execution of the process of resolving a mismatch of electric power modes. In this example, the status of the main body 101 is an "engine off state" of the power-saving mode, and the status of the operation apparatus 102 is an "LCD OFF state" of the power-saving mode.

In this state, on the premise that the condition for shifting the electric power mode of the operation apparatus 102 to the "sleep state" is satisfied, the first control part 302 begins a process of shifting the electric power mode of the operation apparatus 102 to the "sleep state".

At this timing, it is assumed that the user, for example, places a manuscript on an automatic document feeding unit for using the copier function of the image forming system 100. By placing the manuscript on the automatic document feeding unit, the electric power mode of the main body 101 shifts to the "standby state" of the regular mode.

In this situation, the electric power mode of the operation apparatus 102 shifts to the "sleep state" of the power-saving mode when the process of shifting to the "sleep state" is completed by the first control part 302 whereas the electric power mode of the main body 101 becomes the "standby state" of the regular mode (FIG. 12B). That is, the mismatch of electric power modes described with reference to FIGS. 11A-11C occurs.

When the first control part 302 is executing the process of shifting the electric power mode to the "sleep state" of the power-saving mode, the first control part 302 is unable to shift to another power-saving mode in the middle of the shifting process because the first control part 302 is also executing a subsequent process that is to be executed along with the process of shifting to the "sleep state". Therefore, immediately after the process of shifting to the "sleep state" is completed, the first control part 302 shifts the electric power mode to the "LCD ON state" of the power-saving mode. Thereby, the mismatch of the electric power modes can be resolved.

FIG. 13 is a sequence diagram illustrating the flow of the process of resolving the mismatch of the electric power modes. In Step S1301, the first control part 302 determines that a condition for shifting to the "sleep state" is satisfied when a predetermined time has elapsed.

In Step S1302, the first control part 302 inquires the first application 301 whether the shifting to the "sleep state" is possible. The first application that has received the inquiry determines whether the shifting to the "sleep state" is possible.

In Step S1304, when the first application 301 determines that the shifting to the "sleep state" is possible, the first application 301 notifies the result of the determination of the shifting (OK) to the first control part 302. Thereby, in Step S1305, the first control part 302 shifts the electric power mode to the "sleep state" of the power-saving mode by controlling the power supply.

Then, in Step S1306, the second control part 312 of the main body 101 determines that an operation of shifting the electric power mode to the regular mode (instruction of shifting to the "standby state" of the regular mode) when the user places a manuscript on the automatic document feeding unit.

In Step S1307, the second control part 312 controls the power supply inside the main body 101, so that power is supplied to all of the power supply destinations inside the main body 101 including the engine part 225. This starts the supplying of power to all of the power supply destinations in the main body 101 including the engine part 225 which had been disconnected.

In Step S1308, the second control part 312 notifies the result of the determination of the shifting (OK) to the second communication control part 313 as a shifting report for indicating the completion of shifting to the "standby state" of the regular mode.

Then, in Step S1309, the second communication control part 313 notifies the result of the determination of the shifting (OK) to the operation apparatus 102. In Step S1310, the first control part 302 of the operation apparatus 102 that has received the determination result (OK) determines whether there is a mismatch of electric power modes.

At this point, the first control part 302 is still in the middle of the process of shifting the electric power mode of the operation apparatus 102 to the "sleep state" of the power-saving mode. Therefore, when the first control part 302 completes the process of shifting the electric power mode of the operation apparatus 102, the first control part 302 determines that there is a mismatch of electric power modes. In Step S1311, after completing the process of shifting the electric power mode of the is operation apparatus 102 to the "sleep state" of the power-saving mode, the first control part 302 shifts the electric power mode to the "LCD ON state" of the regular mode by controlling the power supply.

Accordingly, power is supplied to all of the power supply destinations inside the operation apparatus 102, so that various operations can be performed on the operation panel 110. That is, the mismatch of electric power modes illustrated in FIGS. 11A-11C can be resolved.

Figure 14A:
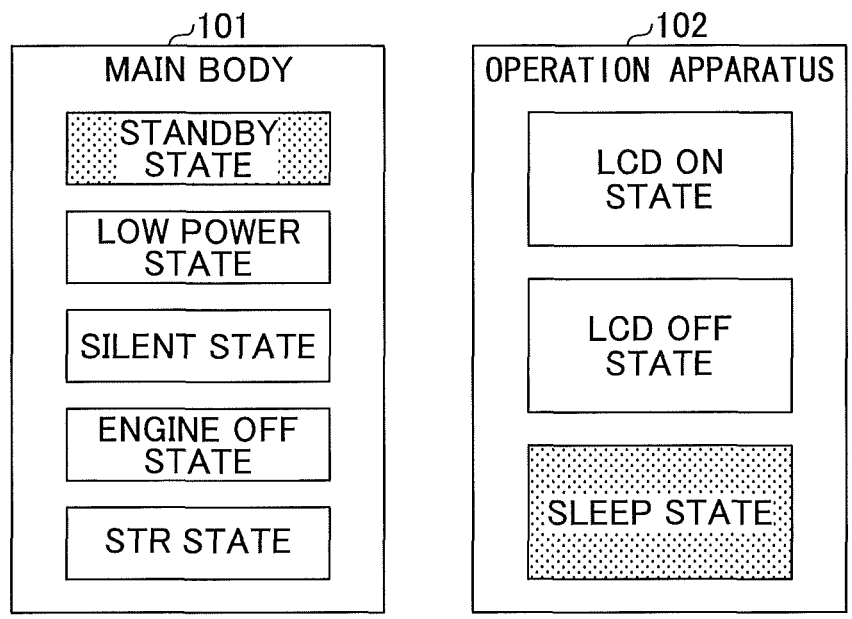
FIGS. 14A and 14B are schematic diagrams illustrating the effects of a process of resolving a mismatch of electric power modes.
Figure 14B:
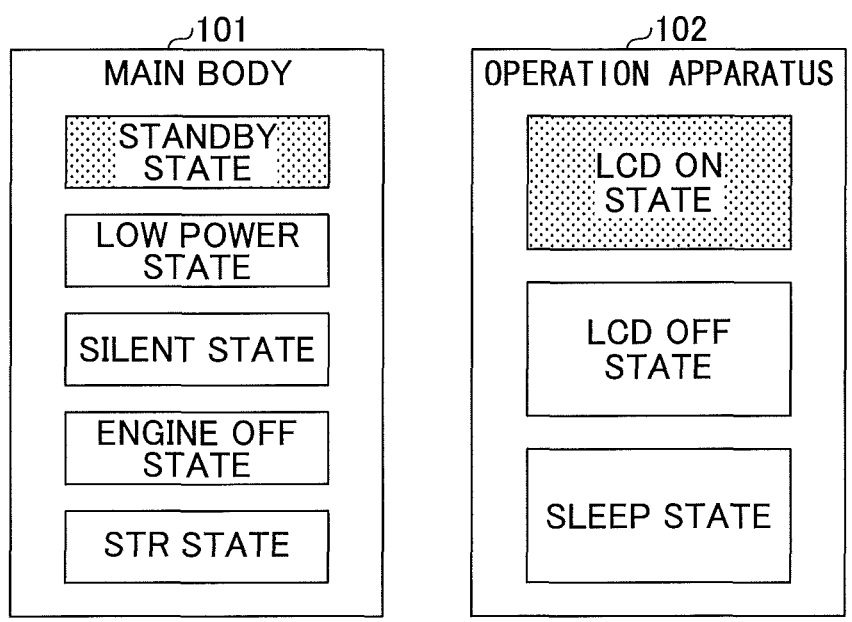

FIGS. 14A and 14B are schematic diagrams illustrating the effects of the process of resolving the mismatch of electric power modes. The examples of FIGS. 14A and 14B illustrate a state that is immediately before the power mode of the operation apparatus 102 is shifted to the "LCD ON state" and a state that is after the power mode of the operation apparatus 102 is shifted to the "LCD ON state" in Step S1311.

As illustrated in FIG. 14A, the electric power mode of the operation apparatus 102 shifts to the "sleep state" of the power-saving mode by the completion of the process of shifting to the "sleep state". Further, in this state, the electric power mode of the main body 101 is the "standby state" of the regular mode.

In contrast, by controlling the power supply in Step S1311, the electric power mode of the operation apparatus 102 shifts from the "sleep state" to the "LCD ON state" as illustrated in FIG. 14B.

<Process of Resolving Mismatch of Electric Power Modes (2)>

Figure 15A:
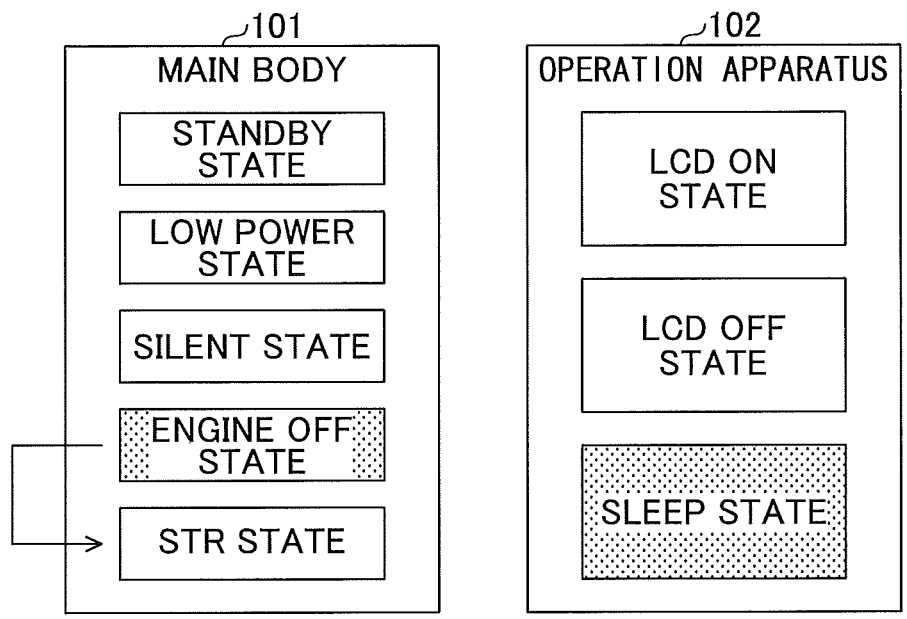
FIGS. 15A and 15B are schematic diagrams illustrating a second example for describing execution of a process of resolving a mismatch of electric power modes.
Figure 15B:
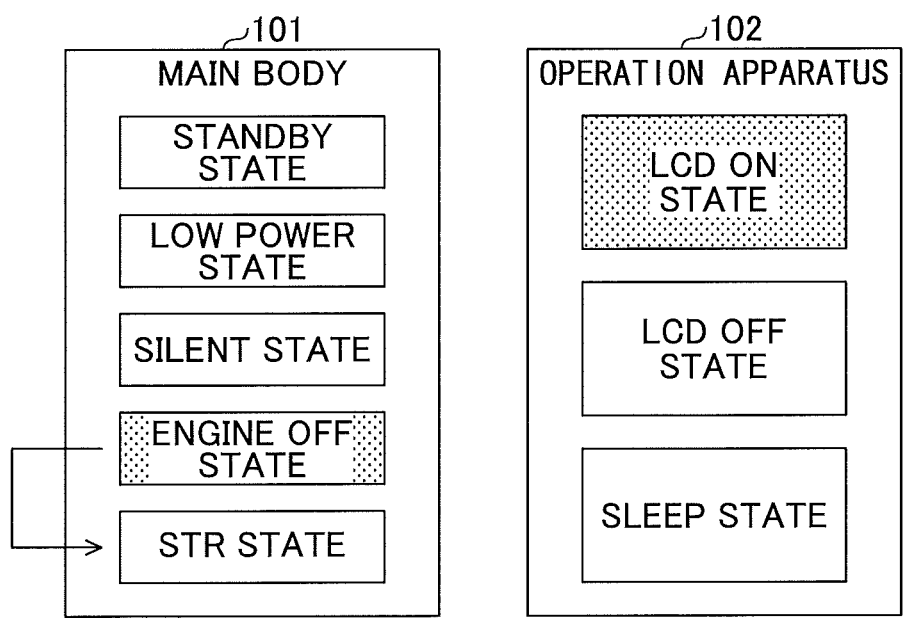

Next, another detailed example of the process of resolving a mismatch of electric power modes is described. FIGS. 15A and 15B are schematic diagrams illustrating the second example for describing the execution of the process of resolving a mismatch of electric power modes. In this example, the status of the main body 101 is an "engine off state" of the power-saving mode, and the status of the operation apparatus 102 is a "sleep state" of the power-saving mode.

In this state, on the premise that the condition for shifting the electric power mode of the main body 101 to the "STR state" of the power-saving mode is satisfied, the second control part 312 begins a process of shifting the electric power mode of the main body 101 to the "STR state".

At this timing, it is assumed that the user, for example, touches the touch panel 215-2 of the operation panel 110. By touching the touch panel 215-2 of the operation panel 110, the electric power mode of the operation apparatus 102 shifts from the "sleep state" of the power-saving mode to the "LCD ON state" of the regular mode.

In this situation, the electric power mode of the operation apparatus 102 shifts to the "LCD ON state" of the regular mode when the process of shifting to the "STR state" is completed by the second control part 312 whereas the electric power mode of the main body 101 becomes the "STR state" of the power saving mode (FIG. 15B). In other words, the mismatch of electric power modes described with reference to FIGS. 11A-11C occurs.

When the first control part 302 determines that a mismatch of electric power modes has occurred, the first control part 302 transmits an instruction to shift the electric power mode to the "standby state" of the regular mode to the second control part 312 of the main body 101. Thereby, the mismatch of the electric power modes can be resolved.

Figure 16:
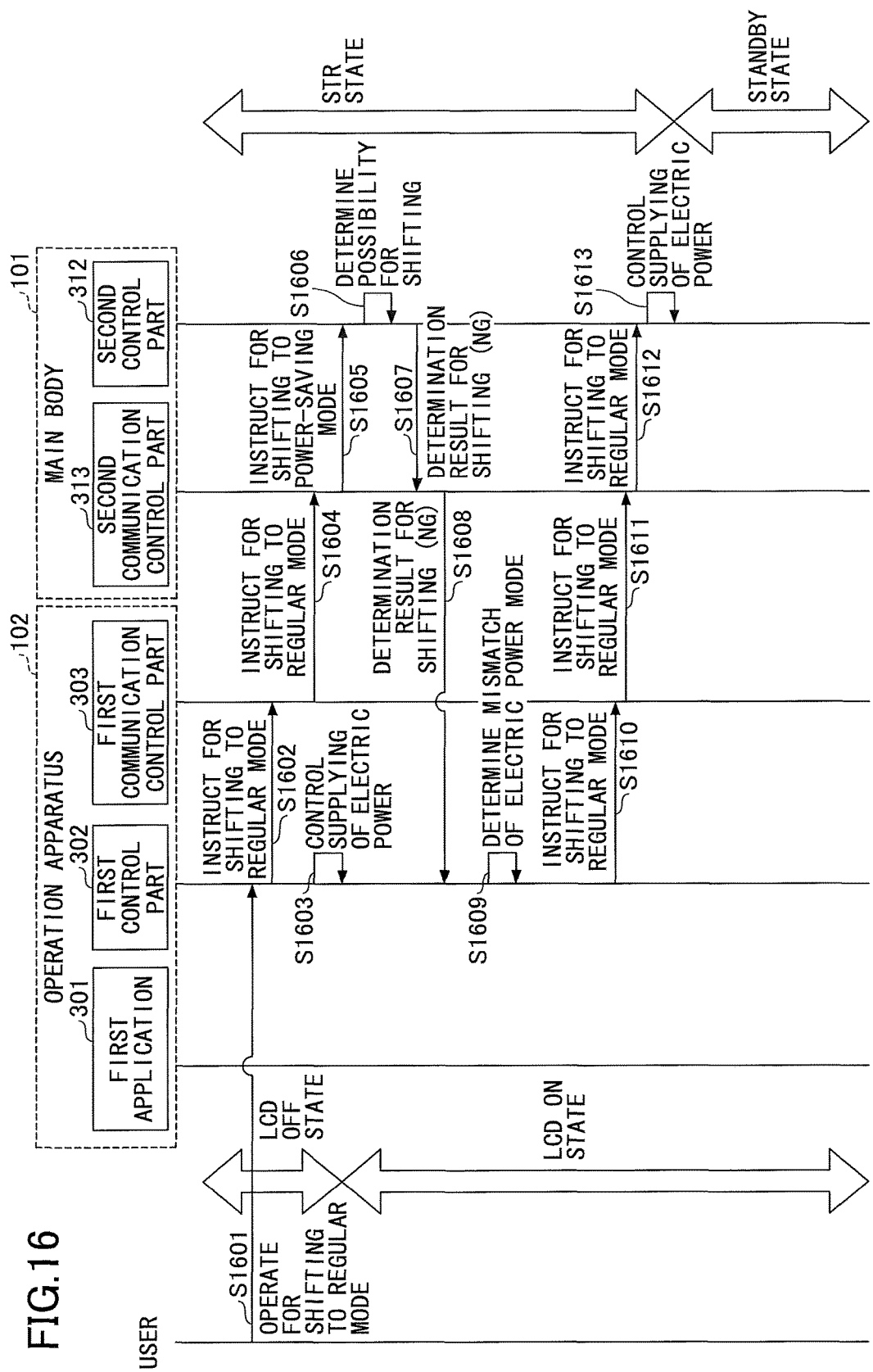
FIG. 16 is a sequence diagram illustrating the flow of a process of resolving a mismatch of electric power modes.

FIG. 16 is a sequence diagram illustrating the flow of the process of resolving the mismatch of electric power mode. In Step S1601, the user touches the touch panel 215-2 of the operation panel 110. In Step S1602, the first control part 302 notifies an instruction to shift from the "sleep state" of the power-saving mode to the "LCD ON state" of the regular mode to the first communication control part 303.

In Step S1603, the first control part 302 shifts the "sleep state" of the power-saving mode to the "LCD ON state" of the regular mode by controlling the power supply. Thereby, the supplying of power to the LCD device 215-1 (which had been disconnected) is started.

Further, in Step S1604, the first communication control part 303 transmits an instruction to shift the "sleep state" of the power-saving mode to the "LCD ON state" of the regular mode to the second communication control part 313 of the main body 101. In Step S1605, the second communication control part 313 receives the instruction and transmits the instruction to the second control part 312.

In Step S1606, the second control part 312 that has received the instruction from the second communication control part 313 determines whether shifting to the "standby state" of the regular mode is possible.

At this point, the second control part 312 is still in the middle of the process of shifting the electric power mode of the main body 101 to the "STR state" of the power-saving mode. Therefore, the second control part 312 is unable to immediately shift the electric power mode to the "standby state" of the regular mode.

Accordingly, in Step S1607, the second control part 312 transmits a notice (shifting determination result "NG (No Good)") to the second communication control part 313 indicating that the electric power mode cannot be shifted to the "standby state" of the regular mode. Further, in Step S1608, the second communication control part 313 transmits the shifting determination result (NG) to the first control part 302 of the operation apparatus 102.

In Step S1609, the first control part 302 that has received the shifting determination result (NG) determines whether the mismatch of the electric power modes has occurred. At this point, the electric power mode of the operation apparatus 102 has already shifted from the power-saving mode to the "LCD ON state" of the regular mode. Meanwhile the first control part 302 recognizes that the electric power mode of the main body 101 cannot shift to the "standby state" of the regular mode according to the shift determination result (NG). Therefore, the first control part 302 determines that a mismatch of electric power modes has occurred.

In Step S1610, the first control part 302 transmits an instruction to the first communication control part 303 to instruct that the electric power mode of the main body 101 is to shift to the "standby state" of the regular mode. In Step S1611, the first communication control part 303 transmits the shifting instruction to the second communication control part 313. Further, in Step S1612, the second communication control part 313 transmits the shifting instruction to the second control part 312.

In this example, it is assumed that the second control part 312 has completed the process of shifting to the "STR state" at the timing in which the second control part 312 receives the shifting instruction from the second communication control part 313. If the shifting to the "STR state" is completed, the second control part 312 can shift the electric power mode of the main body 101 to the "standby state" of the regular mode.

Accordingly, in Step S1613, the second control part 312 shifts the electric power mode of the main body 101 to the "standby state" of the regular mode by controlling the power supply. Thereby, the electric power mode of the main body 101 shifts to the "standby state" of the regular mode. That is, the mismatch of electric power modes illustrated in FIGS. 11A-11C can be resolved.

Figure 17A:
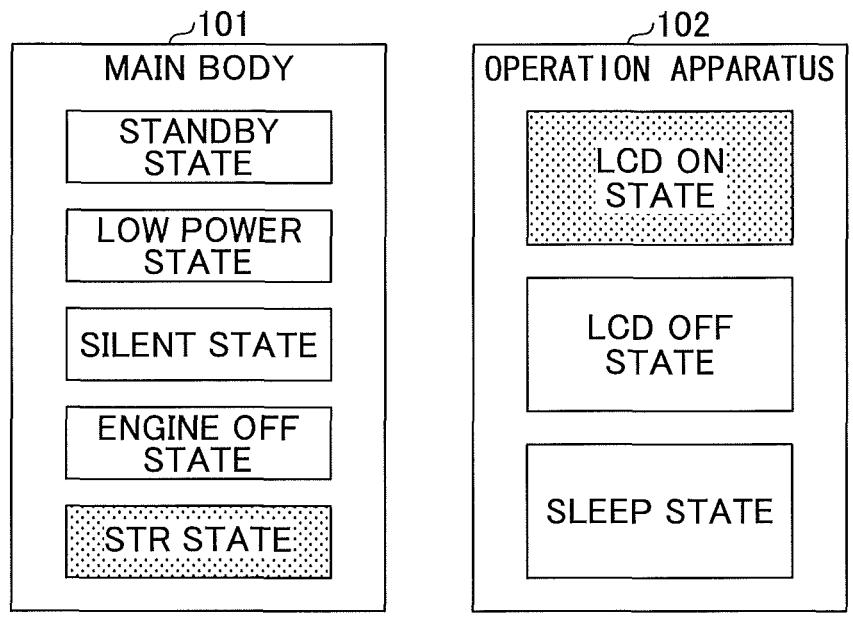
FIGS. 17A and 17B are schematic diagrams illustrating the effects of a process of resolving a mismatch of electric power modes.
Figure 17B:
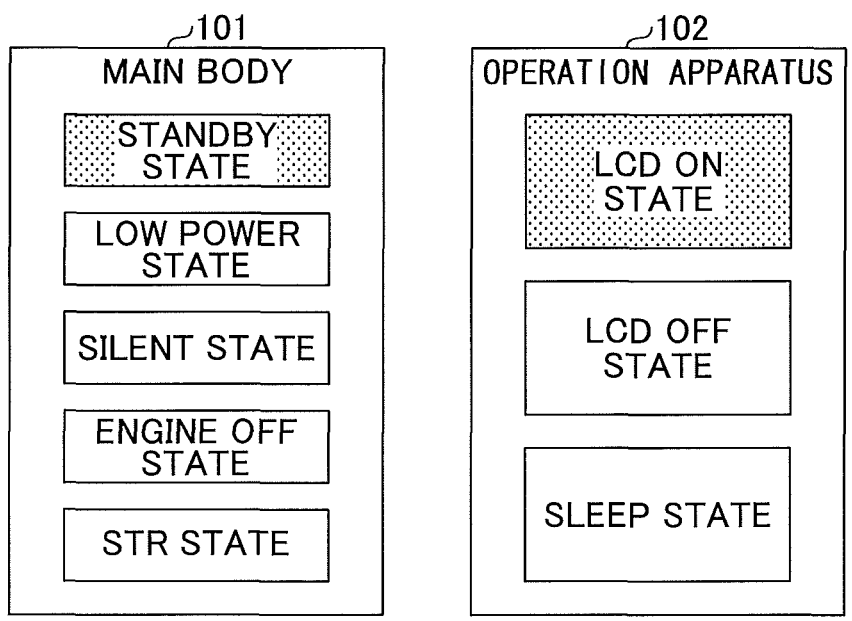

FIGS. 17A and 17B illustrate the effects attained by the process of resolving the mismatch of electric power modes. The embodiments of FIGS. 17A and 17B illustrate a state where the second control part 312 has received a shifting instruction in Step S1612 and a state after the supply of electric power has been controlled in Step S1613.

As illustrated in FIG. 17A, the electric power mode of the main body 101 becomes the "STR state" of the power-saving mode whereas the electric power mode of the operation apparatus 102 becomes the "LCD ON state" of the regular mode when the shifting to the "STR state" of the power-saving mode is completed.

On the other hand, as illustrated in FIG. 17B, the electric power mode of the main body 101 shifts from the "STR state" of the power-saving mode to the "standby state" of the regular mode.

<Process of Resolving Mismatch of Electric Power Modes (3)>

Figure 18A:
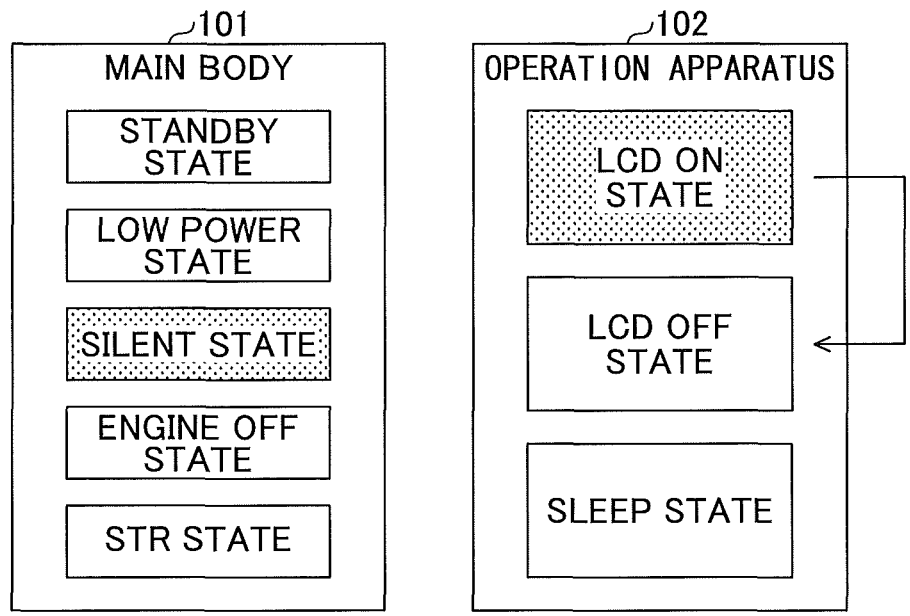
FIGS. 18A and 18B are schematic diagrams illustrating a third example for describing execution of a process of resolving a mismatch of electric power modes.
Figure 18B:
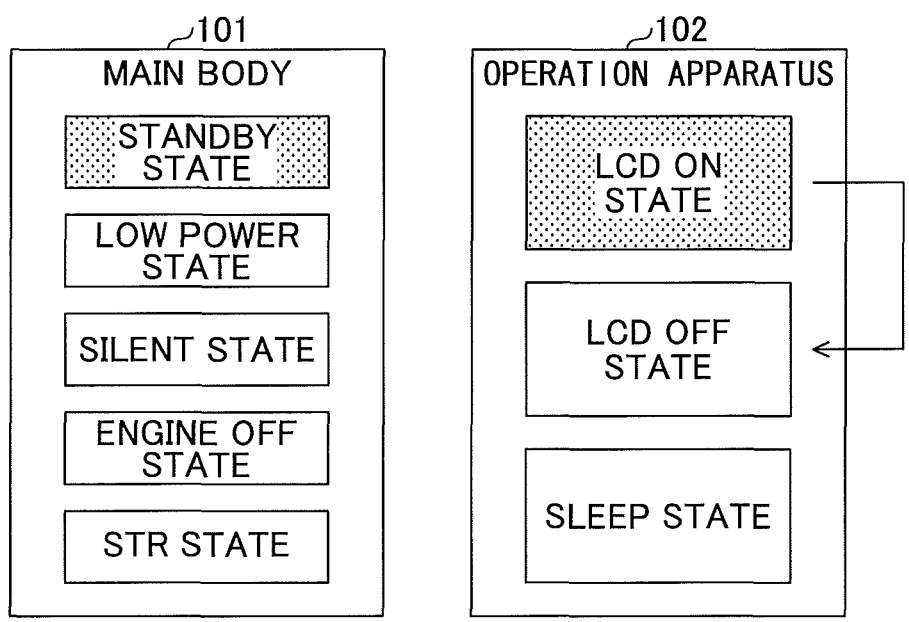

Next, another detailed example of the process of resolving a mismatch of electric power modes is described. FIGS. 18A and 18B are schematic diagrams illustrating the third example for describing the execution of the process of resolving a mismatch of electric power modes. In this example, the status of the main body 101 is a "silent state" of the power-saving mode, and the status of the operation apparatus 102 is a "LCD ON" of the power-saving mode.

In this state, on the premise that the condition for shifting the electric power mode of the operation apparatus 102 from the "LCD ON state" of the regular mode to the "LCD OFF state" of the power-saving mode is satisfied, the second control part 312 begins a process of shifting the electric power mode of the operation apparatus 102 to the "LCD OFF state".

At this timing, it is assumed that the user, for example, places a manuscript on an automatic document feeding unit for using the copier function of the image forming system 100. By placing the manuscript on the automatic document feeding unit, the electric power mode of the main body 101 shifts to the "standby state" of the regular mode.

In this situation, the electric power mode of the operation apparatus 102 shifts to the "LCD OFF state" of the power-saving mode when the process of shifting to the "LCD OFF state" is completed by the first control part 302 whereas the electric power mode of the main body 101 becomes the "standby state" of the regular mode. That is, the mismatch of electric power modes described with reference to FIGS. 11A-11C occurs.

In this example, the first control part 302 can cancel the shifting to the "LCD OFF state" of the power-saving mode. More specifically, the first control part 302 immediately cancels the shifting to the "LCD OFF state" of the power-saving mode when the first control part 302 determines that a mismatch of electric power modes has occurred. Thereby, the mismatch of the electric power modes can be resolved.

FIG. 19 is a sequence diagram illustrating the flow of the process of resolving the mismatch of electric power modes. In Step S1901, the first control part 302 determines that the condition for shifting to the "LCD OFF state" is satisfied when a predetermined time has elapsed.

In Step S1902, the first control part 302 inquires whether shifting to the "LCD OFF state" is possible to the first application 301. In Step S1902, the first application 301 receiving the inquiry determines whether shifting to the "LCD OFF state" is possible. In Step S1904, if the first application 301 determines that shifting to the "LCD OFF state" is possible, the first application 301 transmits a result of the determination of the shifting (OK) to the first control part 302. Then, in Step S1905, the first control part 302 begins a process of shifting the electric power mode of the operation apparatus 102 to the "LCD OFF state" of the power-saving mode by controlling the power supply.

At this timing, in Step S1906, the second control part 312 of the main body 101 determines that a shifting operation for shifting to a regular mode has been performed (instruction to shift to "standby state" of the regular mode) when the user, for example, places a manuscript on an automatic document feeding unit.

Further, in Step S1907, the second control part 312 shifts the electric power mode of the main body 101 from the "silent state" of the power-saving mode to the "standby state" of the regular mode by controlling the power supply.

Further, in Step S1908, the second control part 312 notifies the completion of the shifting to the "standby state" of the regular mode (shifting OK) as a shifting report to the second communication control part 313.

Further, in Step S1909, the second communication control part 313 notifies that the electric power mode of the main body 101 has shifted to the "standby state" of the regular mode (shifting determination result "OK") to the operation apparatus 102. In Step S1910, the first control part 302 of the operation apparatus 102 that has received the shifting determination result (OK) from the main body 101 determines whether there is a mismatch of electric power modes.

At this point, the first control part 302 is still in the middle of the process of shifting the electric power mode of the operation apparatus 102 to the "LCD OFF state" of the power-saving mode. Therefore, when the first control part 302 completes the process of shifting the electric power mode of the operation apparatus 102, the first control part 302 determines that there is a mismatch of electric power modes (Step S1910). Then, in Step S1911, the first control part 302 cancels the process of shifting the electric power mode of the operation apparatus 102 to the "LCD OFF state" of the power-saving mode.

Thereby, the electric power mode of the operation apparatus 102 is maintained as the "LCD ON state" of the regular mode, so that the power supply to the LCD device 215-1 of the operation panel 110 is maintained. That is, the mismatch of the electric power modes illustrated in FIGS. 11A-11C can be avoided.

Figure 20A:
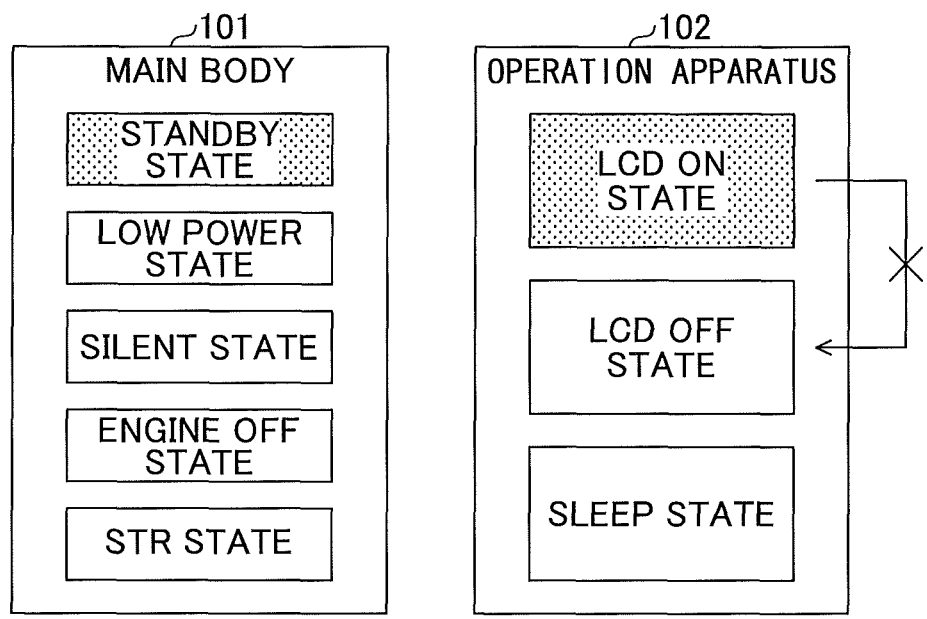
FIGS. 20A and 20B are schematic diagrams illustrating the effects of a process of resolving a mismatch of electric power modes.
Figure 20B:
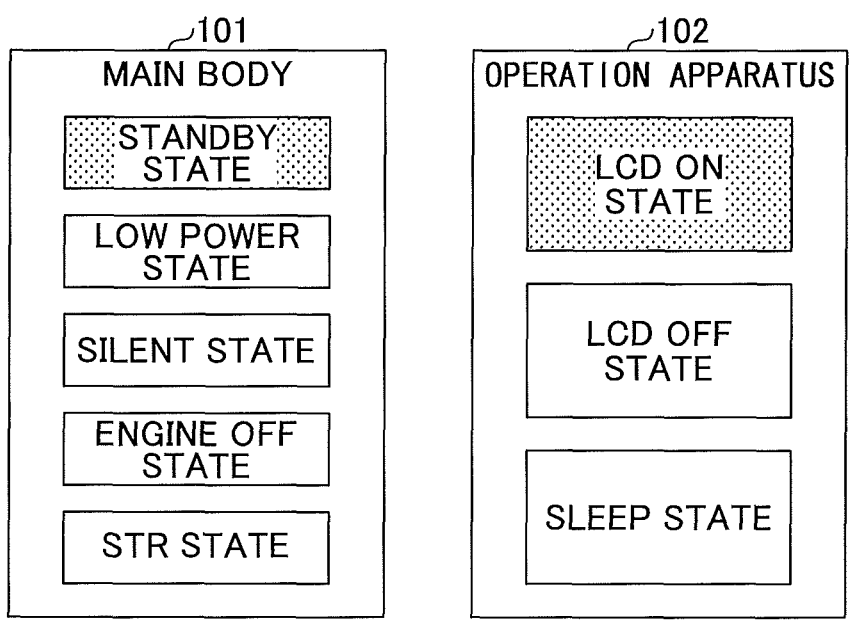

FIGS. 20A and 20B are schematic diagrams illustrating the effects of the process of resolving the mismatch of electric power modes. The example of FIG. 20A illustrates the state of the electric power modes of the main body 101 and the operation apparatus 102 when determining the mismatch of electric power modes in Step S1910. The example of FIG. 20B illustrates the state of the electric power modes of the main body 101 and the operation apparatus 102 after cancelling the shifting of the electric power mode in response to the result of the determination of FIG. 20B.

By cancelling the process of shifting to the "LCD OFF state" of the power-saving mode of the operation apparatus 102 as illustrated in FIG. 20A, the operation apparatus 102 can maintain the "LCD ON state" of the regular mode as illustrated in FIG. 20B.

Hence, with the image forming system 100 according to the above-described embodiments of the present invention: the operation apparatus 102 and the main body 101 can independently switching their electric power modes; whether a mismatch of the electric power modes of the operation apparatus 102 and the electric power mode of the main body 101 (which may be caused by the independent switching of electric power modes) would occur can be determined; in a case where the mismatch is determined to occur, the mismatch can be resolved by instructing to change the electric power mode of the operation apparatus 102 or the electric power mode of the main body 101; and in a case where the mismatch is determined to occur, the mismatch can be resolved by cancelling a process of shifting the electric power mode of the operation apparatus 102.

Accordingly, with the image forming system according to the above-described embodiments of the present invention, power consumption of the image forming system can be further reduced without degrading the convenience of the user.

OTHER EMBODIMENTS

In the above-described embodiments, although the functions of each part of the operation apparatus 102 (first control part 302, first communication control part 303) are implemented by executing a program stored in a storage device such as the ROM 212, other devices and methods may also be used. For example, at least a part of the functions of each part of the operation apparatus 102 may be implemented by using a dedicated hardware circuit such as a semiconductor integrated circuit.

In the above-described embodiments, although the functions of each part of the main body 101 (second control part 312, second communication control part 313) are implemented by executing a program stored in a storage device such as the ROM 222, other devices and methods may also be used. For example, at least a part of the functions of each part of the main body 101 may be implemented by using a dedicated hardware circuit such as a semiconductor integrated circuit.

The present invention is not limited to the specifically disclosed embodiments, and variations and modifications may be made without departing from the scope of the present invention.

What is claimed is:

1. An image forming system comprising:
    a main body including a first CPU that controls an electric power mode of the main body and an engine that executes image processing; and
    an operation apparatus that receives an operation for instructing the engine to execute the image processing, the operation apparatus including a second CPU that controls an electric power mode of the operation apparatus;

wherein in a case where the operation apparatus receives an instruction to shift the electric power mode of the main body or the electric power mode of the operation apparatus, the first CPU is configured to determine whether shifting is possible based on a first process program executed by the main body and control an electric power supply of the main body according to the determination, and the second CPU is configured to determine whether shifting is possible based on a second process program executed by the operation apparatus and control an electric power supply of the operation apparatus according to the determination, and wherein the second CPU is configured to, when the operation apparatus receives an instruction to activate the second process program, transmit a notice instructing the first CPU to shift the electric power mode of the main body, based on the second process program.

2. The image forming system as claimed in claim 1, wherein the second CPU is configured to, when the operation apparatus receives the instruction, determine whether the notice is required based on the second process program and transmit the notice in response to determining that the notice is required.

3. An image forming system comprising:
   a main body including a first CPU that controls an electric power mode of the main body and an engine that executes image processing; and
   an operation apparatus that receives an operation for instructing the engine to execute the image processing, the operation apparatus including a second CPU that controls an electric power mode of the operation apparatus;
   wherein in a case where the operation apparatus receives an instruction to shift the electric power mode of the main body or the electric power mode of the operation apparatus, the first CPU is configured to determine whether shifting is possible based on a first process program executed by the main body and control an electric power supply of the main body according to the determination, and the second CPU is configured to determine whether shifting is possible based on a second process program executed by the operation apparatus and control an electric power supply of the operation apparatus according to the determination, and
   wherein the second CPU is configured to, when the second CPU receives a notice from the first CPU that the electric power mode of the main body is shifted in response to an operation instructing the shifting of the electric power mode of the main body, cancel shifting the electric power mode of the operation apparatus to a first electric power mode in which an amount of power consumption is reduced in comparison with the amount of power consumption before shifting to the first electric power mode in a case where the electric power mode of the main body is shifted to a second electric power mode in which the amount of power consumption is increased in comparison with the amount of power consumption before shifting to the second electric power mode.

4. The image forming system as claimed in claim 3, wherein the second CPU is configured to, when the second CPU receives the notice, cancel shifting the electric power mode of the operation apparatus to the second electric power mode in a case where the electric power mode of the main body is shifted to the first electric power mode.

5. An image forming system comprising:
   a main body including a first CPU that controls an electric power mode of the main body and an engine that executes image processing; and
   an operation apparatus that receives an operation for instructing the engine to execute the image processing, the operation apparatus including a second CPU that controls an electric power mode of the operation apparatus;
   wherein in a case where the operation apparatus receives an instruction to shift the electric power mode of the main body or the electric power mode of the operation apparatus, the first CPU is configured to determine whether shifting is possible based on a first process program executed by the main body and control an electric power supply of the main body according to the determination, and the second CPU is configured to determine whether shifting is possible based on a second process program executed by the operation apparatus and control an electric power supply of the operation apparatus according to the determination, and
   wherein when a mismatch between the electric power mode of the operation apparatus and the electric power mode of the main body is caused by shifting the electric power mode of the operation apparatus in response to an operation instructing the shifting of the electric power mode of the operation apparatus, the second CPU is configured to transmit a notice to the first CPU instructing to shift the electric power mode of the main body.

* * * * *